(12) United States Patent
Kim et al.

(10) Patent No.: US 12,247,769 B2
(45) Date of Patent: Mar. 11, 2025

(54) VAPOR INJECTION MODULE AND HEAT PUMP SYSTEM USING SAME

(71) Applicant: Hanon Systems, Daejeon (KR)

(72) Inventors: Seong Hun Kim, Daejeon (KR); Hae Jun Lee, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 338 days.

(21) Appl. No.: 17/793,484

(22) PCT Filed: Jan. 14, 2021

(86) PCT No.: PCT/KR2021/000519
§ 371 (c)(1),
(2) Date: Jul. 18, 2022

(87) PCT Pub. No.: WO2021/172752
PCT Pub. Date: Sep. 2, 2021

(65) Prior Publication Data
US 2023/0073993 A1    Mar. 9, 2023

(30) Foreign Application Priority Data

Feb. 28, 2020    (KR) .......................... 10-2020-0025013

(51) Int. Cl.
*F25B 41/385*    (2021.01)
*F25B 43/00*    (2006.01)

(52) U.S. Cl.
CPC .......... *F25B 41/385* (2021.01); *F25B 43/006* (2013.01)

(58) Field of Classification Search
CPC ...... F25B 41/385; F25B 41/39; F25B 43/006; F25B 2400/16
See application file for complete search history.

(56) References Cited

U.S. PATENT DOCUMENTS

| | | | |
|---|---|---|---|
| 4,881,718 A | 11/1989 | Champagne | |
| 2002/0078702 A1* | 6/2002 | Makizono | F28D 7/04 62/271 |
| 2017/0167762 A1* | 6/2017 | Kato | F25B 41/38 |

FOREIGN PATENT DOCUMENTS

| | | | |
|---|---|---|---|
| JP | 2003254453 A | 9/2003 | |
| JP | 2013092355 A | 5/2013 | |

(Continued)

OTHER PUBLICATIONS

English translation of Nishikawa et al. (WO-2015107876-A1) (Year: 2015).*

(Continued)

*Primary Examiner* — Miguel A Diaz
(74) *Attorney, Agent, or Firm* — NORTON ROSE FULBRIGHT US LLP

(57) ABSTRACT

The present invention provides a vapor injection module including a first expansion means having an inlet port into which a refrigerant is introduced, and first line and second line connected to the inlet port so that the introduced refrigerant flows therethrough, the first expansion means being disposed at a connection portion between the first line and the second line and configured to control a flow direction of the refrigerant and whether to expand the refrigerant depending on an air conditioning mode, a gas-liquid separator connected to the first line and configured to separate the introduced refrigerant into a liquid refrigerant and a gaseous refrigerant, a second expansion means connected to a movement passage through which the liquid refrigerant separated in the gas-liquid separator flows, the second expansion means being configured to expand the introduced refrigerant, and a first outlet port connected to the second line and the second expansion means.

29 Claims, 17 Drawing Sheets

(56) References Cited

FOREIGN PATENT DOCUMENTS

| | | |
|---|---|---|
| JP | 2015137779 A | 7/2015 |
| KR | 100500767 B1 | 7/2005 |
| KR | 20110119553 A | 11/2011 |
| KR | 20180087142 A | 8/2018 |
| KR | 101903140 B1 | 10/2018 |
| KR | 20190032072 A | 3/2019 |
| KR | 20190051742 A | 5/2019 |
| WO | WO-2015107876 A1 * 7/2015 ......... B60H 1/00921 |

OTHER PUBLICATIONS

Office Action issued on Mar. 20, 2023 by the CIPO in the corresponding Patent Application No. 1-2020-0025013, with English translation.

* cited by examiner

FIG. 8
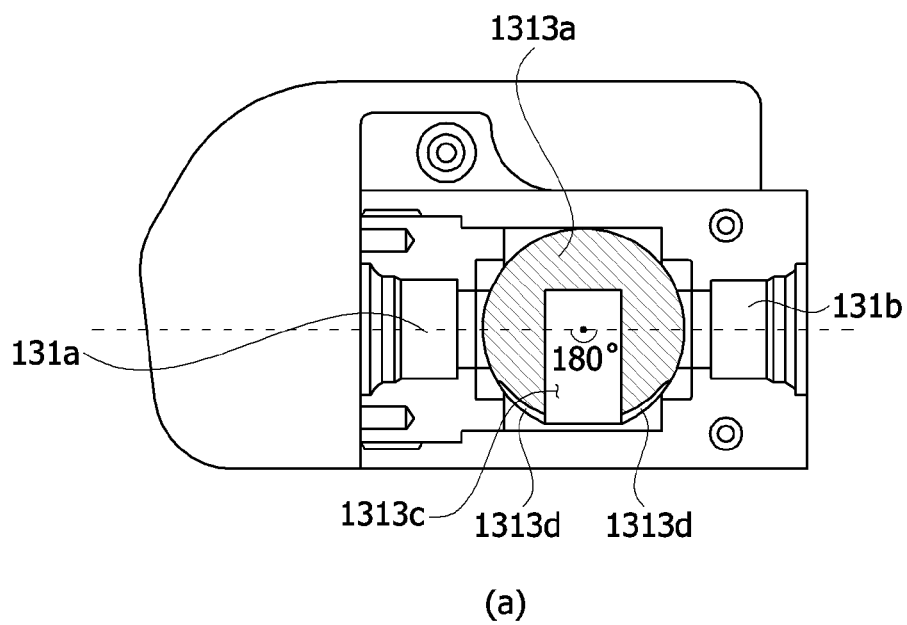
(a)
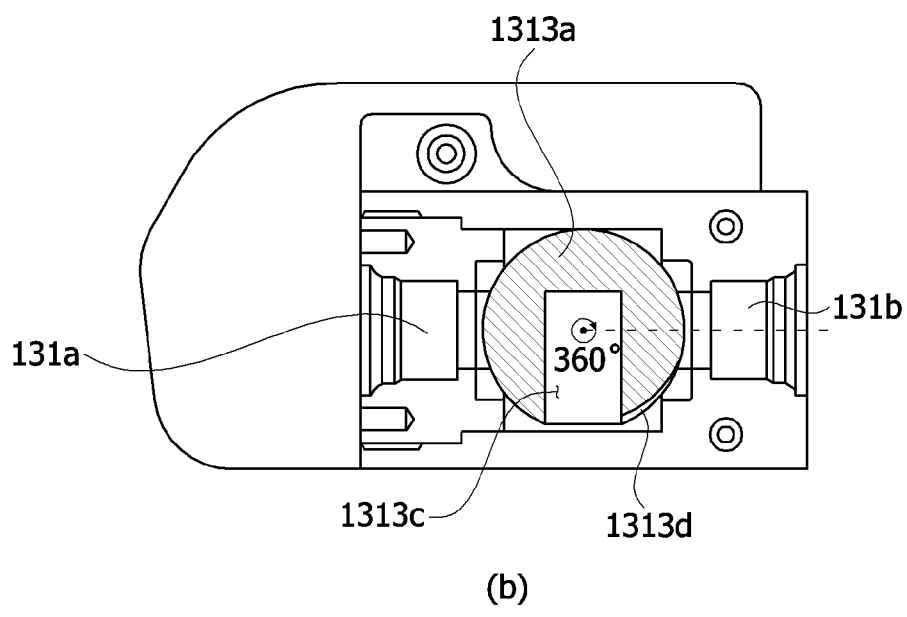
(b)

VAPOR INJECTION MODULE AND HEAT PUMP SYSTEM USING SAME

CROSS REFERENCE TO RELATED APPLICATIONS

This application is a national phase under 35 U.S.C. § 371 of International Application No. PCT/KR2021/000519 filed on Jan. 14, 2021, which claims the benefit of priority from Korean Patent Application No. 10-2020-0025013 filed on Feb. 28, 2020. The entire contents of these applications are incorporated herein by reference in their entirety.

TECHNICAL FIELD

An embodiment relates to a vapor injection module and a heat pump system using the same. The embodiment relates to a vapor injection module capable of expanding a refrigerant, performing a bypass operation, and separating a gas and a liquid depending on an air conditioning mode, and a heat pump system using the same.

BACKGROUND ART

As development and research have been conducted on environmental-friendly technologies and alternative energy sources for replacing fossil raw materials, and electric vehicles and hybrid vehicles have been considered as most attractive fields in recent vehicle industries. Batteries are mounted in the electric vehicles and hybrid vehicles to provide driving power. The power of the battery is used not only to drive the vehicle, but also to cool or heat a vehicle interior.

When the battery is used as a heat source for cooling or heating the interior of the vehicle that provides driving power by using the battery, the traveling distance decreases to that extent. To solve this problem, a method of applying a heat pump system, which has been widely used as a domestic cooling or heating device in the related art, to the vehicle has been proposed.

For reference, the heat pump refers to a process of absorbing low-temperature heat and transferring the absorbed heat to a high-temperature location. For example, the heat pump implements a cycle in which a liquid refrigerant becomes a gaseous refrigerant by evaporating in an evaporator and absorbing heat from the surrounding, and the gaseous refrigerant becomes the liquid refrigerant by dissipating heat to the surrounding by means of a condenser. The application of the heat pump to the electric or hybrid vehicle may advantageously ensure an insufficient heat source in a general air conditioning casing in the related art.

When an outside air temperature is too low during a process of heating a vehicle interior by using the heat pump system, the heating ability significantly deteriorates. This is caused by an insufficient heat absorbing source. When the amount of gaseous refrigerant to be transmitted to a compressor is insufficient, the heating efficiency deteriorates.

Various studies have been performed by vehicle manufacturers in many countries to solve the above-mentioned problems. For example, a method of improving heating performance by using a PTC heater and a method of improving heating performance by using waste heat of electrical components have been used in some instances.

However, even the methods in the related art are not effective in solving a problem of deterioration in heating performance during a heat pump defrosting operation. Further, a method, which unilaterally consumes a battery, is mainly used to improve heating performance, but this method causes a problem of significant deterioration in drivability of the battery.

DISCLOSURE

Technical Problem

An object of an embodiment is to provide a vapor injection module capable of improving heating efficiency even in a cryogenic state with a low outside air temperature.

Another object of the embodiment is to provide a vapor injection module, in which a refrigerant bypasses a gas-liquid separator (LGS) in an interior cooling and non-vapor injection mode, thereby implementing excellent heating efficiency without an unnecessary pressure drop.

Technical problems to be solved by the present invention are not limited to the above-mentioned technical problems, and other technical problems, which are not mentioned above, may be clearly understood by those skilled in the art from the following descriptions.

Technical Solution

An embodiment of the present invention provides a vapor injection module including: a first expansion means having an inlet port into which a refrigerant is introduced, and first line and second line connected to the inlet port so that the introduced refrigerant flows therethrough, the first expansion means being disposed at a connection portion between the first line and the second line and configured to control a flow direction of the refrigerant and whether to expand the refrigerant depending on an air conditioning mode; a gas-liquid separator connected to the first line and configured to separate the introduced refrigerant into a liquid refrigerant and a gaseous refrigerant; a second expansion means connected to a movement passage through which the liquid refrigerant separated in the gas-liquid separator flows, the second expansion means being configured to expand the introduced refrigerant; and a first outlet port connected to the second line and the second expansion means.

In particular, the first expansion means may include a single ball valve configured to rotate and disposed at a center at which the inlet port, the first line, and the second line are connected.

In particular, the ball valve may include: an inflow hole connected to the inlet port; an outflow hole connected to the inflow hole and configured to be connected to the first or second line by a rotation of the ball valve; and an expansion groove connected to an end of the outflow hole.

In particular, the expansion groove may be formed at one side of the outflow hole based on a rotation direction of the ball valve and configured to expand and discharge the introduced refrigerant.

In particular, the expansion grooves may be respectively formed at two opposite sides of the outflow hole based on a rotation direction of the ball valve and configured to expand and discharge the introduced refrigerant.

In particular, the gas-liquid separator may include: a housing having an internal space in which a refrigerant flows; an outflow passageway disposed at an upper side of the housing and configured to discharge the gaseous refrigerant, the outflow passageway being provided in the form of a pipe to prevent the liquid refrigerant from flowing into the outflow passageway; and a movement passage disposed at a lower side of the housing and configured to discharge the liquid refrigerant.

In particular, the first line connected to the housing may be disposed to discharge the refrigerant toward a sidewall of the housing.

In particular, an inner wall of the housing may have a cylindrical structure having an inclination.

In particular, a partition wall part may be disposed at an end of the movement passage and prevent the refrigerant from scattering.

In particular, the partition wall part may be larger than a diameter of the outflow passageway and prevent the scattering refrigerant from flowing to the outflow passageway.

In particular, the second expansion means may include: an orifice configured to expand the refrigerant introduced through the movement passage; and a check valve configured to determine whether to move the refrigerant.

In particular, the check valve may be operated by a pressure difference between the movement passage and the refrigerant flowing along the second line.

In particular, a thermal insulation member may be disposed between a first body portion in which the movement passage is disposed and a second body portion in which the orifice is disposed.

In particular, the ball valve may have a rotation angle range of 360 degrees.

The ball valve may have a rotation angle range of 180 degrees.

In particular, the expansion groove of the ball valve may be disposed to overlap the first line or the second line to expand the refrigerant.

In particular, the ball valve may control the amount of expansion of the refrigerant by adjusting a region in which the expansion groove overlaps the first line or the second line.

Another embodiment of the present invention provides a vapor injection heat pump system including: a compressor configured to compress and discharge a refrigerant; a condenser configured to condense the compressed refrigerant at the time of heating a vehicle interior; a first expansion means configured to expand the condensed refrigerant and transmit the expanded refrigerant to an exterior heat exchanger, expand the condensed refrigerant and transmit the expanded refrigerant to a gas-liquid separator, or allow the condensed refrigerant to pass therethrough depending on an air conditioning mode; the gas-liquid separator configured to separate the refrigerant expanded by the first expansion means into a gaseous refrigerant and a liquid refrigerant, discharge the gaseous refrigerant to the compressor, and discharge the liquid refrigerant to a second expansion means; the second expansion means configured to expand the liquid refrigerant discharged from the gas-liquid separator and transmit the expanded refrigerant to the exterior heat exchanger; the exterior heat exchanger configured to condense or evaporate the refrigerant transmitted from the first or second expansion means; a third expansion means configured to control a flow direction and whether to expand the refrigerant transmitted from the exterior heat exchanger depending on the air conditioning mode; and an evaporator configured to cool a vehicle interior by using the refrigerant transmitted from the third expansion means.

In particular, when the air conditioning mode is a cooling mode, the first expansion means may allow the compressed refrigerant to pass therethrough and transmit the refrigerant to the exterior heat exchanger.

In particular, when the air conditioning mode is a non-vapor injection heating mode, the first expansion means may expand the condensed refrigerant and transmit the expanded refrigerant to the exterior heat exchanger.

In particular, when the air conditioning mode is a vapor injection heating mode, the first expansion means may expand the condensed refrigerant and transmit the expanded refrigerant to the gas-liquid separator.

In particular, the vapor injection heat pump system may further include: a fourth expansion means connected to the third expansion means in parallel; and a chiller connected to the fourth expansion means and configured to allow the refrigerant and a coolant to exchange heat with each other.

In particular, the vapor injection heat pump system may further include an interior heat exchanger configured to heat the vehicle interior by allowing air conditioning air to exchange heat with a coolant having exchanged heat with the refrigerant in the condenser.

In particular, a coolant heater may be disposed between the condenser and the interior heat exchanger.

In particular, the vapor injection heat pump system may include: a refrigerant circulation line in which the refrigerant circulates; a coolant circulation line in which the coolant circulates; and an air conditioning casing configured to accommodate the evaporator and the interior heat exchanger and perform the heat exchange with the air conditioning air, the evaporator may be disposed in the refrigerant circulation line, and the interior heat exchanger may be disposed in the coolant circulation line.

In particular, the coolant circulation line may include: a heating line configured to heat the vehicle interior by circulating the coolant; and a refrigerating line configured to cool a battery and an electrical component by circulating the coolant.

In particular, the refrigerating line may include: a first connection line branching off from one side of the refrigerating line and connected to the heating line; and a second connection line branching off from the other side of the refrigerating line and connected to the heating line.

In particular, the first connection line, the second connection line, and the heating line may be connected to a first direction switching valve, and the refrigerating line and the heating line may be connected to or disconnected from each other by the first direction switching valve.

In particular, the refrigerating line may include a third connection line connected to the battery in parallel and configured to pass through a chiller, the third connection line may be connected to the refrigerating line by a third direction switching valve, and a flow of the coolant in the third connection line may be allowed or cut off by the third direction switching valve.

In particular, an orifice integrated check valve, an electronic expansion means, or an orifice integrated shut-off valve may be used as the second expansion means.

Advantageous Effects

According to the embodiment, it is possible to improve the heating efficiency even in a cryogenic state with a low outside air temperature.

In particular, the refrigerant bypasses the gas-liquid separator in the interior cooling and non-vapor injection mode, which makes it possible to improve heating efficiency without an unnecessary pressure drop.

The various, beneficial advantages and effects of the present invention are not limited to the above-mentioned contents and may be more easily understood during the process of describing the specific embodiments of the present invention.

DESCRIPTION OF DRAWINGS

FIG. 8 is a view illustrating a comparison between operations of expansion grooves illustrated in FIGS. 4 and 5.

EXPLANATION OF REFERENCE NUMERALS AND SYMBOLS

Figure 1:
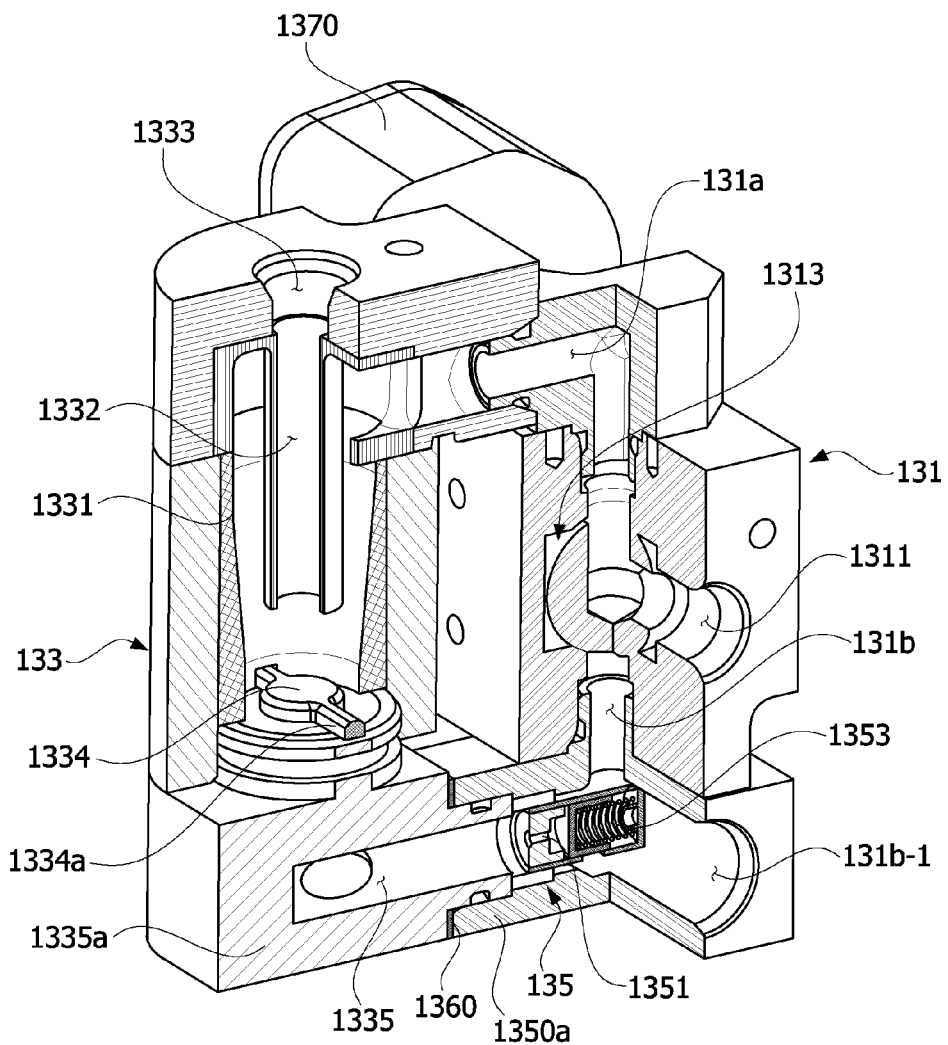
FIG. 1 is a view illustrating an interior of a vapor injection module according to an embodiment of the present invention.

100: Refrigerant circulation line
110: Compressor
120: Condenser
130: Vapor injection module
131: First expansion means
131a: First line
131b: Second line
131b-1: First outlet port
133: Gas-liquid separator
135: Second expansion means
140: Exterior heat exchanger
150: Evaporator
151: Third expansion means
160: Chiller
161: Fourth expansion means
170: Refrigerant branch part
180: Accumulator
190: Air conditioning casing
200: Coolant circulation line
210: Heating line
211: First pump
212: Coolant heater
213: Interior heat exchanger
214: First direction switching valve
230: Cooling line
230a: First connection line
230b: Second connection line
230c: Third connection line
231: Radiator
232: Second direction switching valve
233: First coolant joint
234: Third pump
235: Battery
236: Third direction switching valve
237: Second coolant joint
238: Second pump
239: Electrical component
1311: Inlet port
1313: Ball valve
1313a: Ball valve main body
1313b: Inflow hole
1313c: Outflow hole
1313d: Expansion groove
1331: Housing
1332: Outflow passageway
1333: Second outlet port
1334: Partition wall part
1334a: Fixing portion
1335: Movement passage
1335a: First body portion
1350: Body
1350a: Second body portion
1351: Orifice
1353: Check valve
1360: Thermal insulation member
1370: Actuator

MODE FOR INVENTION

Hereinafter, exemplary embodiments of the present invention will be described in detail with reference to the accompanying drawings.

However, the technical spirit of the present invention is not limited to some embodiments described herein but may be implemented in various different forms. One or more of the constituent elements in the embodiments may be selectively combined and substituted within the scope of the technical spirit of the present invention.

In addition, unless otherwise specifically and explicitly defined and stated, the terms (including technical and scientific terms) used in the embodiments of the present invention may be construed as the meaning which may be commonly understood by the person with ordinary skill in the art to which the present invention pertains. The meanings of the commonly used terms such as the terms defined in dictionaries may be interpreted in consideration of the contextual meanings of the related technology.

In addition, the terms used in the embodiments of the present invention are for explaining the embodiments, not for limiting the present invention.

In the present specification, unless particularly stated otherwise, a singular form may also include a plural form. The expression "at least one (or one or more) of A, B, and C" may include one or more of all combinations that can be made by combining A, B, and C.

In addition, the terms first, second, A, B, (a), and (b) may be used to describe constituent elements of the embodiments of the present invention.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Hereinafter, embodiments will be described in detail with reference to the accompanying drawings. The same or corresponding constituent elements are assigned with the same reference numerals regardless of reference numerals, and the repetitive description thereof will be omitted.

FIGS. 1 to 15 clearly illustrate only main features for conceptually and clearly understanding the present invention. As a result, various modifications of the drawings are expected, and the scope of the present invention need not be limited to particular shapes illustrated in the drawings.

Figure 2:
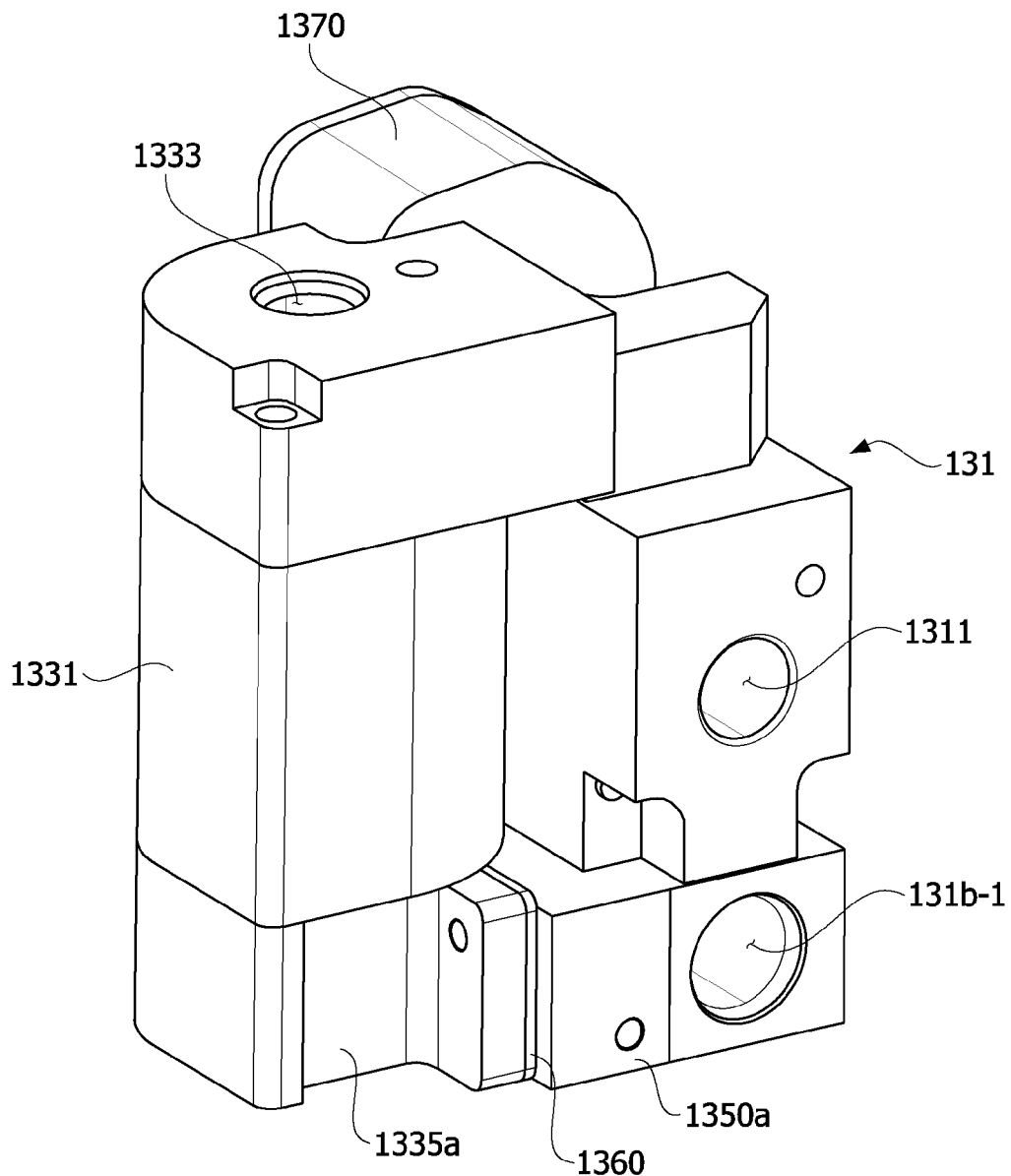
FIG. 2 is a perspective view of FIG. 1.
Figure 3:
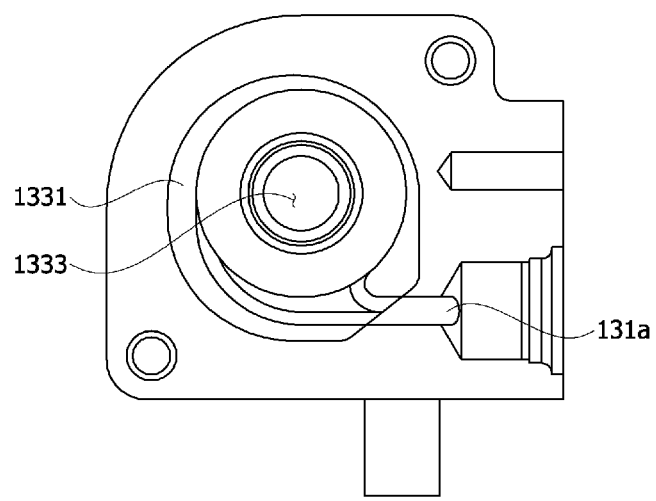
FIG. 3 is a view illustrating a state in which a refrigerant flows into a gas-liquid separator in FIG. 1.
Figure 4:
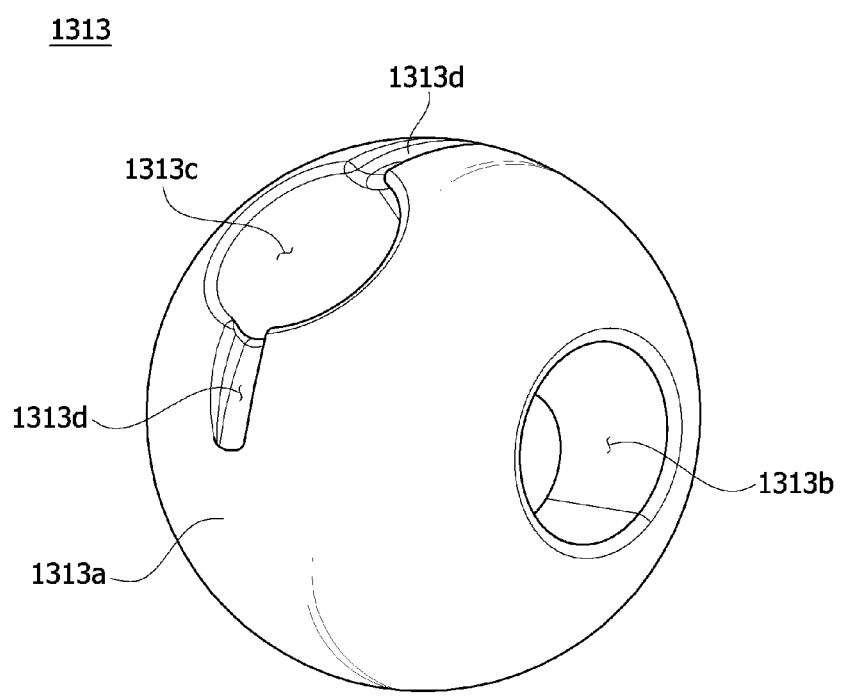
FIG. 4 is a view illustrating a first embodiment of a ball valve which is the component illustrated in FIG. 1.
Figure 5:
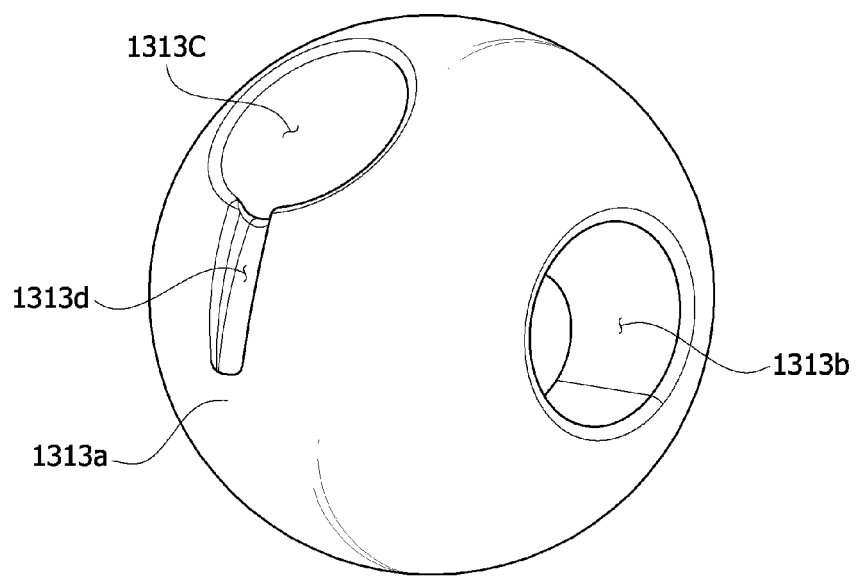
FIG. 5 is a view illustrating a second embodiment of the ball valve which is the component illustrated in FIG. 1.
Figure 6:
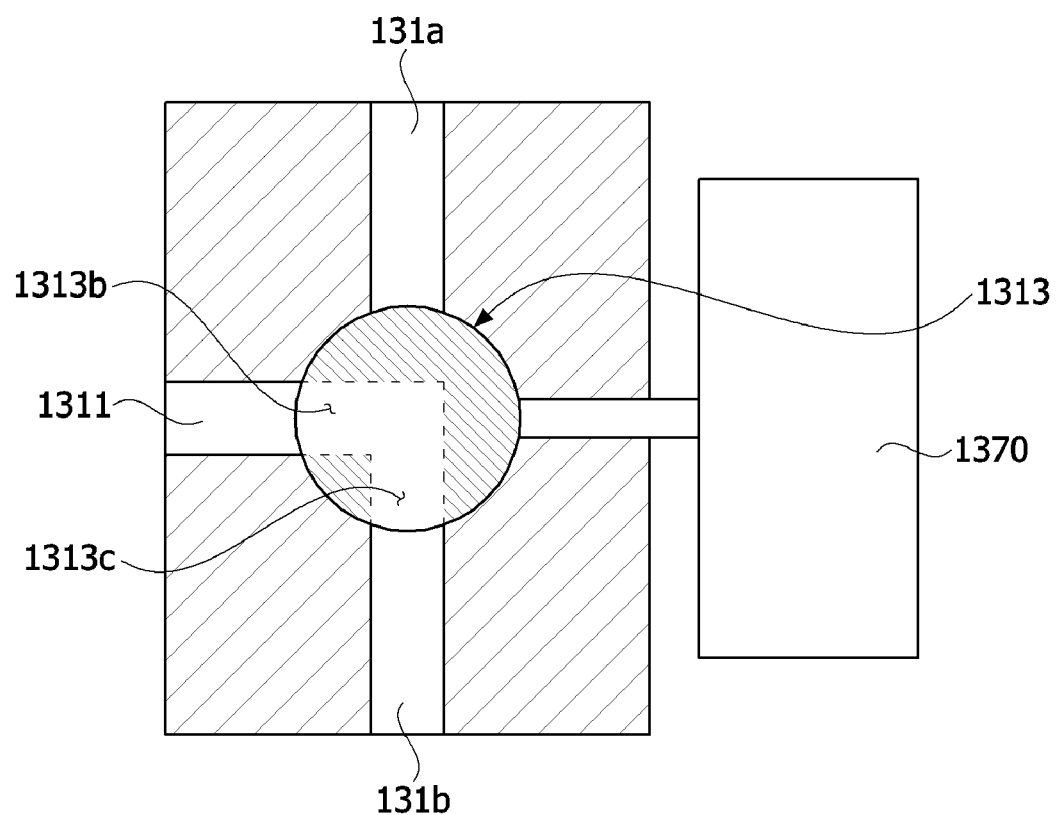
FIG. 6 is a view illustrating an arrangement structure in which an outflow hole illustrated in FIG. 3 allows a refrigerant to perform a bypass operation.
Figure 7:
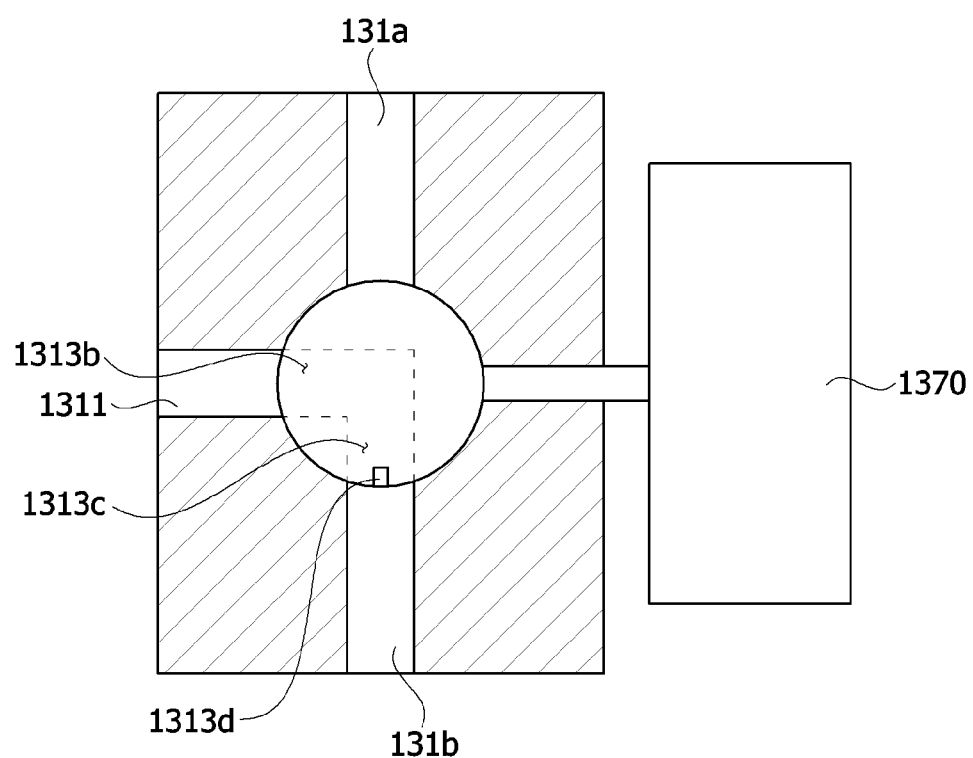
FIG. 7 is a view illustrating an arrangement structure in which an expansion hole illustrated in FIG. 3 expands the refrigerant.

FIG. 1 is a view illustrating an interior of a vapor injection module according to an embodiment of the present invention, FIG. 2 is a perspective view of FIG. 1, FIG. 3 is a view illustrating a state in which a refrigerant flows into a gas-liquid separator in FIG. 1, FIG. 4 is a view illustrating a first embodiment of a ball valve which is the component illustrated in FIG. 1, FIG. 5 is a view illustrating a second embodiment of the ball valve which is the component illustrated in FIG. 1, FIG. 6 is a view illustrating an arrangement structure in which an outflow hole illustrated in FIG. 3 allows a refrigerant to perform a bypass operation, FIG. 7 is a view illustrating an arrangement structure in which an expansion hole illustrated in FIG. 3 expands the refrigerant, FIG. 8 is a view illustrating a comparison between operations of expansion grooves illustrated in FIGS. 4 and 5, and FIGS. 9 to 12 are views illustrating an arrangement position and an operation of the ball valve depending on an air conditioning mode.

Referring to FIGS. 1 to 12, a vapor injection module according to an embodiment of the present invention may include a first expansion means 131, an actuator 1370, a gas-liquid separator 133, a second expansion means 135, and a first outlet port 131b-1.

The first expansion means 131 may include an inlet port 1311 into which a refrigerant is introduced, and first and second lines 131a and 131b connected to the inlet port 1311 so that the introduced refrigerant may flow therethrough. The first expansion means 131 may include a ball valve 1313 disposed at a connection portion between the first and second lines 131a and 131b and configured to control a flow direction of the refrigerant and whether to expand the refrigerant depending on the air conditioning mode.

The inlet port 1311 is a passageway into which the refrigerant having passed through the compressor 110 is introduced. The refrigerant may flow to the ball valve 1313 through the inlet port 1311.

The first and second lines 131a and 131b are passageways in which the refrigerant introduced through the inlet port 1311 is separated. The first line 131a is connected to the gas-liquid separator 133. The second line 131b may be connected to the second expansion means 135 so that the refrigerant flows directly to the second expansion means 135 without passing through the gas-liquid separator 133 depending on the air conditioning mode.

In one embodiment, the first and second lines 131a and 131b may be disposed on the same line. The inlet port 1311 may be connected to the first and second lines 131a and 131b at an angle of 90 degrees.

The first line 131a discharges the refrigerant into the gas-liquid separator 133. In this case, the first line 131a is disposed to be deflected toward a sidewall of an internal space of the gas-liquid separator 133. The discharged refrigerant may flow downward by gravity while rotating.

The ball valve 1313 may be disposed in the first expansion means 131. The ball valve 1313 may be disposed in a region in which the inlet port 1311 is connected to the first and second lines 131a and 131b. The ball valve 1313 may control the flow direction of the refrigerant and whether to expand the refrigerant.

Referring to FIGS. 4, 5, and 8, the ball valve 1313 may include a ball valve main body 1313a having a spherical shape. The ball valve main body 1313a may include an inflow hole 1313b, an outflow hole 1313c connected to the inflow hole 1313b, and an expansion groove 1313d connected to an end of the outflow hole 1313c.

The inflow hole 1313b and the outflow hole 1313c are connected at an angle of 90 degrees. The inflow hole 1313b may be disposed to be always directed toward the inlet port 1311. The outflow hole 1313c may be disposed to be directed toward the first line 131a or the second line 131b by the operation of the actuator 1370.

The ball valve 1313 may rotate about a central axis of the inflow hole 1313b, such that the arrangement position of the outflow hole 1313c may be adjusted.

At least one expansion groove 1313d may be formed at an end of the outflow hole 1313c. In one embodiment, the expansion groove 1313d may have an elongated shape, such that the refrigerant may be expanded by a change in pressure of the refrigerant.

The ball valve 1313 operates to move or expand the refrigerant. The ball valve 1313 may change a position of the outflow hole 1313c and a position of the expansion groove 1313d by rotating so that the refrigerant may be moved or expanded.

As illustrated in FIGS. 4 and 8A, the ball valve 1313 may have the expansion grooves 1313d disposed at two opposite sides of the outflow hole 1313c and configured to face each other. The expansion grooves 1313d may be disposed in a rotation direction of the ball valve 1313 and expand the refrigerant.

In this case, the ball valve 1313 having the expansion grooves 1313d disposed at the two opposite sides may have a rotation radius of 180 degrees in order to determine whether to expand the refrigerant in the first and second lines 131a and 131b.

In the case in which the expansion grooves 1313d are disposed at the two opposite sides, the ball valve 1313 may have a rotation angle of 180 degrees so that the outflow hole 1313c is disposed in the first line 131a or the second line 131b. The expansion by the expansion grooves 1313d may be performed at an angle smaller than the rotation angle. Therefore, a length of the expansion groove 1313d in the case in which the expansion grooves 1313d are disposed at the two opposite sides may be shorter than a length of the expansion groove 1313d in the case in which the expansion groove 1313d is disposed at one side (see FIG. 8B). In the case in which the expansion grooves 1313d are disposed at the two opposite sides, the rotation radius of the ball valve 1313 may decrease, thereby improving operation responsiveness.

In the ball valve 1313 illustrated in FIGS. 5 and 8B, the expansion groove 1313d may be disposed at one side based on the rotation direction. In this case, the ball valve 1313 may have a rotation radius of 360 degrees. The length of the expansion groove 1313d in the case in which the expansion groove 1313d is disposed at one side is longer than the length of the expansion groove 1313d in the case in which the expansion grooves 1313d are disposed at the two opposite sides of the outflow hole 1313c. In the case in which the expansion groove 1313d is disposed at one side, the length of the expansion groove 1313d may increase, thereby increasing a flow rate. Therefore, it is possible to improve controllability of the refrigerant system.

The ball valves illustrated in FIGS. 4 and 5 may be selected depending on control characteristics. An operation of the ball valve 1313 will be described below.

Referring to FIG. 6, to allow the refrigerant to perform the bypass operation, the inflow hole 1313b of the ball valve 1313 is disposed to be coincident with the inlet port 1311 of the first expansion means 131. The outflow hole 1313c is moved to an inlet of the first line 131a or an inlet of the second line 131b by the rotation of the ball valve 1313. To allow the refrigerant to perform the bypass operation, the ball valve 1313 may be disposed such that the outflow hole 1313c coincides with the inlet of the first line 131a so that the refrigerant may pass through the outflow hole 1313c and flow to the first line 131a or the second line 131b.

Referring to FIG. 7, to expand the refrigerant, the inflow hole 1313b of the ball valve 1313 is disposed to be coincident with the inlet port 1311 of the first expansion means 131, and the outflow hole 1313c is disposed to deviate from the inlet of the first line 131a or the inlet of the second line 131b. The refrigerant introduced through the inlet port 1311 of the first expansion means 131 passes through the inflow hole 1313b of the ball valve 1313 and flows to the outflow hole 1313c. In this case, the outflow hole 1313c of the ball valve 1313 is closed, such that the refrigerant flows to the expansion groove and expands, and the expanded refrigerant may flow to the first line 131a or the second line 131b.

To expand the refrigerant, the expansion groove 1313d illustrated in FIGS. 5 and 6 is disposed to overlap the first line 131a or the second line 131b, such that the flowing refrigerant may expand. In this case, the configuration in which the expansion groove 1313d overlaps the first line 131a or the second line 131b means that the first line 131a or the second line 131b communicates with the expansion groove 1313d when viewed from an outlet of the first line 131a or an outlet of the second line 131b.

In addition, the amount of expansion of the refrigerant may be controlled by adjusting a region in which the expansion groove 1313d overlap the first line 131a or the second line 131b.

The actuator 1370 may operate the ball valve 1313. The actuator 1370 may determine the flow direction of the refrigerant and whether to expand the refrigerant by rotating the ball valve 1313. The flow direction of the refrigerant and whether to expand the refrigerant may be determined depending on the air conditioning mode.

In one embodiment, an electric actuator or an electric operation member may be used as the actuator 1370, but the present invention is not limited thereto. Various device structures for rotating the ball valve 1313 may be used.

The gas-liquid separator 133 includes a housing 1331, a second outlet port 1333, and a movement passage 1335. The gas-liquid separator 133 may be connected to the first line 131a and separate the refrigerant into a gas and a liquid.

The housing 1331 provides an internal space in which the refrigerant flows. The housing 1331 may have a cylindrical structure and an inclined inner wall. The inclination may decrease a radius of the housing toward a lower side of the housing, thereby providing an effect of correcting a flow velocity.

The second outlet port 1333 may be disposed at an upper side of the housing 1331, and the movement passage 1335 may be disposed at a lower side of the housing 1331.

An outflow passageway 1332 may be connected to the second outlet port 1333. The evaporated refrigerant may flow to the second outlet port 1333 through the outflow passageway 1332.

The first line 131a is connected to one side of the upper side of the housing 1331. The first line 131a may be disposed such that the refrigerant is discharged toward the sidewall of the housing 1331, thereby defining a circulation of the refrigerant. In this case, the refrigerant discharged from the first line 131a flows downward while spirally flowing along a sidewall of the outflow passageway 1332.

The refrigerant liquefied in the housing 1331 may flow to the movement passage 1335. A partition wall part 1334 may be disposed in one region of the movement passage 1335.

The partition wall part 1334 may be disposed at a central portion of the movement passage 1335 and prevent the refrigerant flowing through the movement passage 1335 from scattering and flowing into the outflow passageway 1332. In one embodiment, the partition wall part 1334 may have a structure of a circular plate and have a diameter larger than a diameter of the outflow passageway 1332. A shape of the partition wall part is not limited. The partition wall part may be larger than a cross-section of the outflow passageway 1332. The partition wall part may be variously modified depending on a cross-sectional shape of the outflow passageway 1332.

In addition, the partition wall part 1334 may have a fixing portion 1334a, such that the partition wall part 1334 may be fixed to the housing 1331 by means of the fixing portion 1334a. The fixing portion 1334a may be disposed below the outflow passageway 1332 and fixed by being inserted into one region of the housing 1331.

The second expansion means 135 is connected to the movement passage 1335 through which the liquid refrigerant separated in the gas-liquid separator 133 flows. The second expansion means 135 may expand the introduced refrigerant.

The second expansion means 135 may include an orifice 1351 and a check valve 1353 that are sequentially disposed in a direction in which the refrigerant is introduced through the movement passage 1335. In this case, the orifice 1351 and the check valve 1353 may be integrated.

The orifice 1351 may be provided at one side of the body 1350 constituting the second expansion means 135, and the check valve 1353 may be disposed at a rear end of the orifice 1351. The check valve 1353 may have a structure to which an elastic body is connected such that the orifice 1351 is opened or closed by pressure.

In one embodiment, when the refrigerant flows into the second line 131*b*, the check valve 1353 is not opened because the pressure at the side of the orifice 1351 is low. When the refrigerant flows into the first line 131*a* flows through the movement passage 1335, the pressure at the side of the orifice 1351 may be high, the check valve 1353 may be opened, and the refrigerant may flow through the first outlet port 131*b*-1.

The first outlet port 131*b*-1 is connected to the second line 131*b* and the second expansion means 135 and provides a passageway through which the refrigerant flows. In this case, the first outlet port 131*b*-1 and the first inlet port 1311 may be formed in the same direction, thereby minimizing a spatial loss when a pipe is connected to the first outlet port 131*b*-1 and the first inlet port 1311.

Referring to FIGS. 9 to 12, the ball valve 1313 having the single expansion groove 1313*d* rotates within a range of angle of 360 degrees, and the rotation angle varies depending on the air conditioning mode. In this case, the description will be made on the assumption that a center of the ball valve is a rotation center O and an angle of a centerline of the second line 131*b* is 0 degree.

Figure 9:
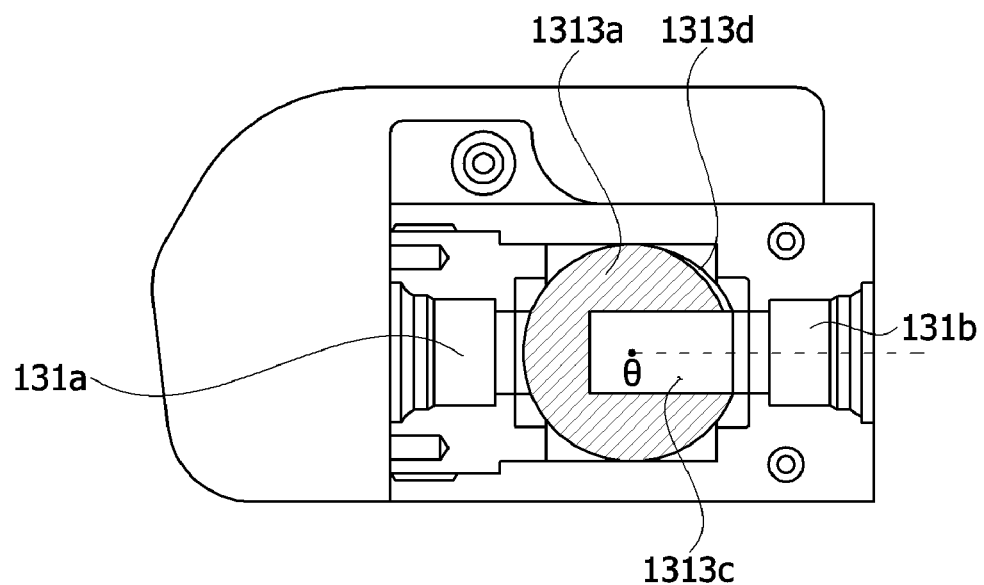
FIGS. 9 to 12 are views illustrating an arrangement position and an operation of the ball valve depending on an air conditioning mode.

FIG. 9 illustrates an arrangement position of the ball valve when the air conditioning mode is an air conditioner mode. The outflow hole 1313*c* of the ball valve 1313 is disposed at an angle of 0 degree with respect to the second line 131*b*.

Figure 10:
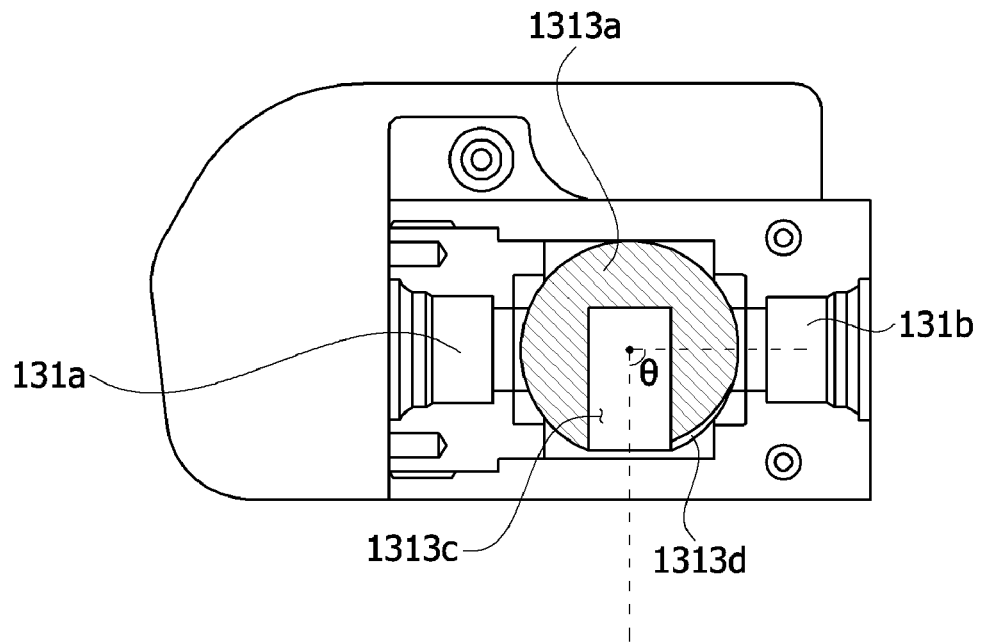

FIG. 10 illustrates that the air conditioning mode is a non-vapor injection heating mode. The outflow hole 1313*c* may be disposed at an angle of 90 degrees in a clockwise direction with respect to the second line 131*b*. In this case, one region of the expansion groove 1313*d* communicates with the second line 131*b*, such that the refrigerant having passed through the outflow hole 1313*c* may expand and flow to the second line 131*b*.

Figure 11:
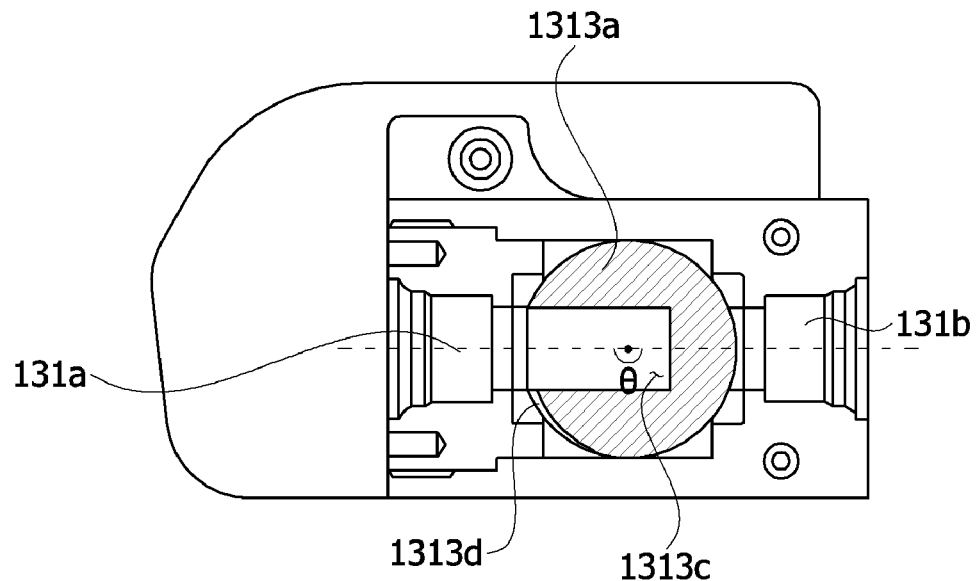

FIG. 11 illustrates a structure in which the refrigerant performs a bypass operation. The outflow hole 1313*c* and the second line 131*b* may be disposed at an angle of 180 degrees in the clockwise direction.

Figure 12:
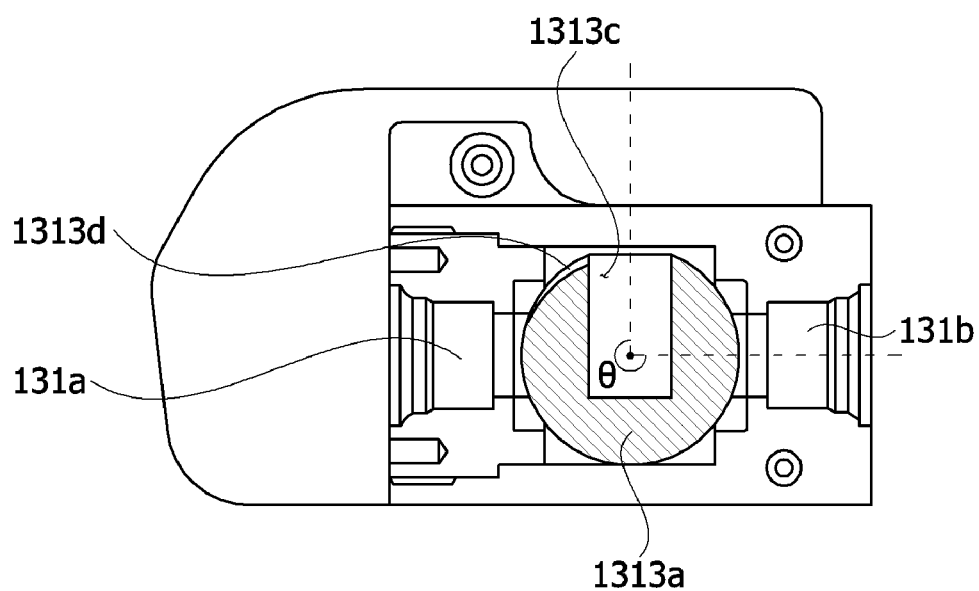

FIG. 12 illustrates that the air conditioning mode is a vapor injection heating mode. The outflow hole 1313*c* may be disposed at an angle of 270 degrees with respect to the second line 131*b*. One region of the expansion groove 1313*d* communicates with the first line 131*a*, such that the refrigerant having passed through the outflow hole 13113*c* may expand and flow to the first line 131*a*. In this case, the expansion groove 1313*d* may be disposed at the right side of the first line 131*a*.

Referring to FIGS. 9 to 12, the ball valve 1313 may rotate by an angle of 90 degrees depending on the air conditioning mode as described above.

However, FIGS. 9 to 12 illustrate one embodiment of the expansion groove 1313*d*. The rotation angle of the ball valve 1313 may be variously modified depending on the length of the expansion groove 1313*d*.

In addition, as illustrated in FIG. 2, a thermal insulation member 1360 may be disposed between a first body portion 1335*a* in which the movement passage 1335 is disposed and a second body portion 1350*a* in which the orifice 1351 is disposed. This is to prevent heat exchange, which is caused by a temperature difference between a front end and a rear end of the orifice 1351 when the refrigerant secondarily expands while passing through the orifice 1351, from affecting decompression characteristics of the orifice. In one embodiment, the thermal insulation member 1360 may be made of rubber or plastic. However, the material of the thermal insulation member 1360 is not limited thereto, and the thermal insulation member 1360 may be modified to be made of various materials for thermal insulation.

Figure 13:
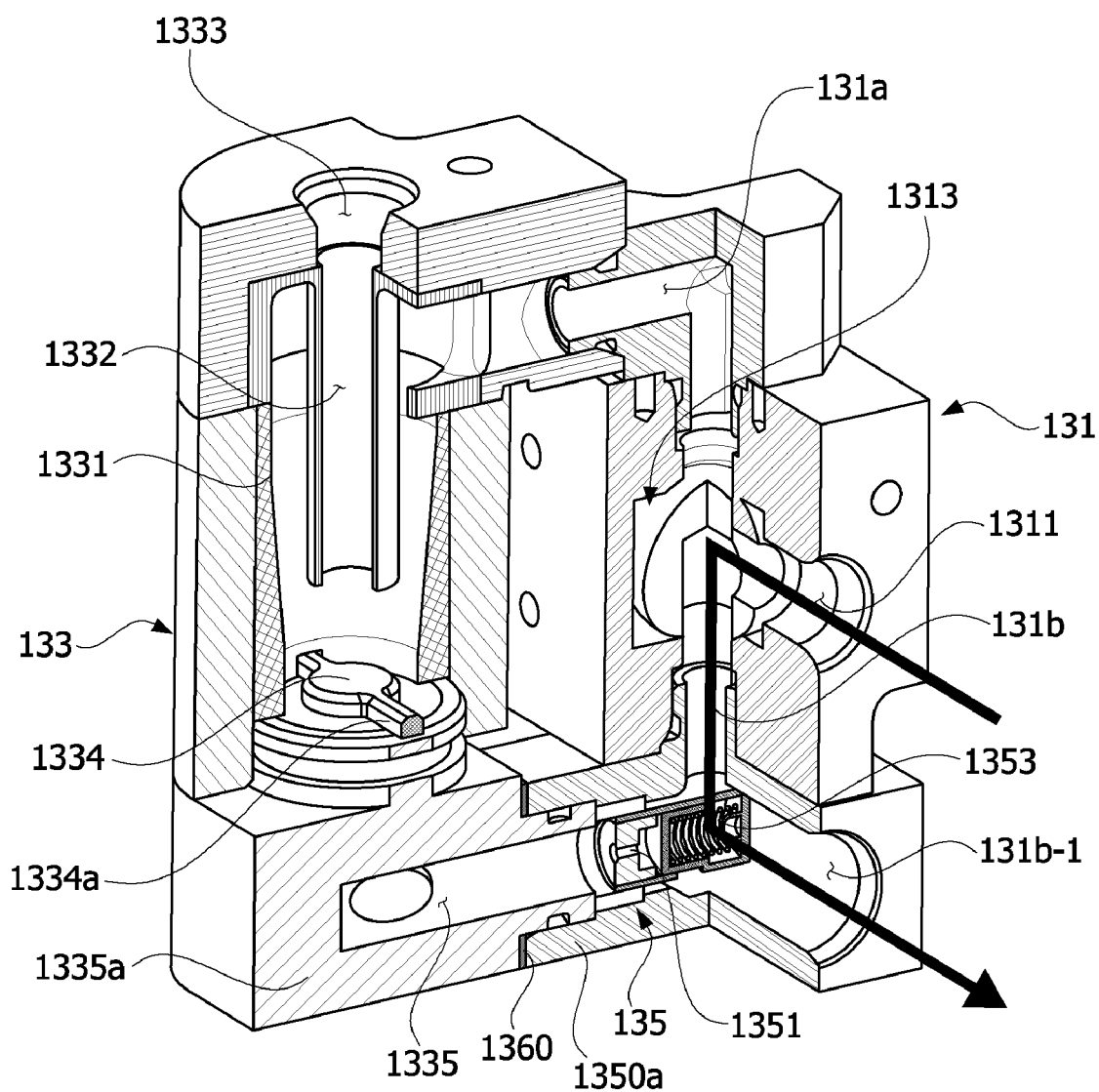
FIG. 13 is a view illustrating an operation of the refrigerant in a cooling mode in FIG. 1.

FIG. 13 is a view illustrating an operation of the refrigerant in a cooling mode in FIG. 1.

Referring to FIG. 13, in the cooling mode, the refrigerant is introduced through the inlet port 1311, and the introduced refrigerant flows through the inflow hole 1313*b* of the ball valve 1313. In this case, the ball valve 1313 is rotated by the actuator 1370, such that the outflow hole 1313*c* is disposed to be directed toward the second line 131*b*. The refrigerant flows to the second line 131*b* through the outflow hole 1313*c* and then flows out through the first outlet port 131*b*-1.

Figure 14:
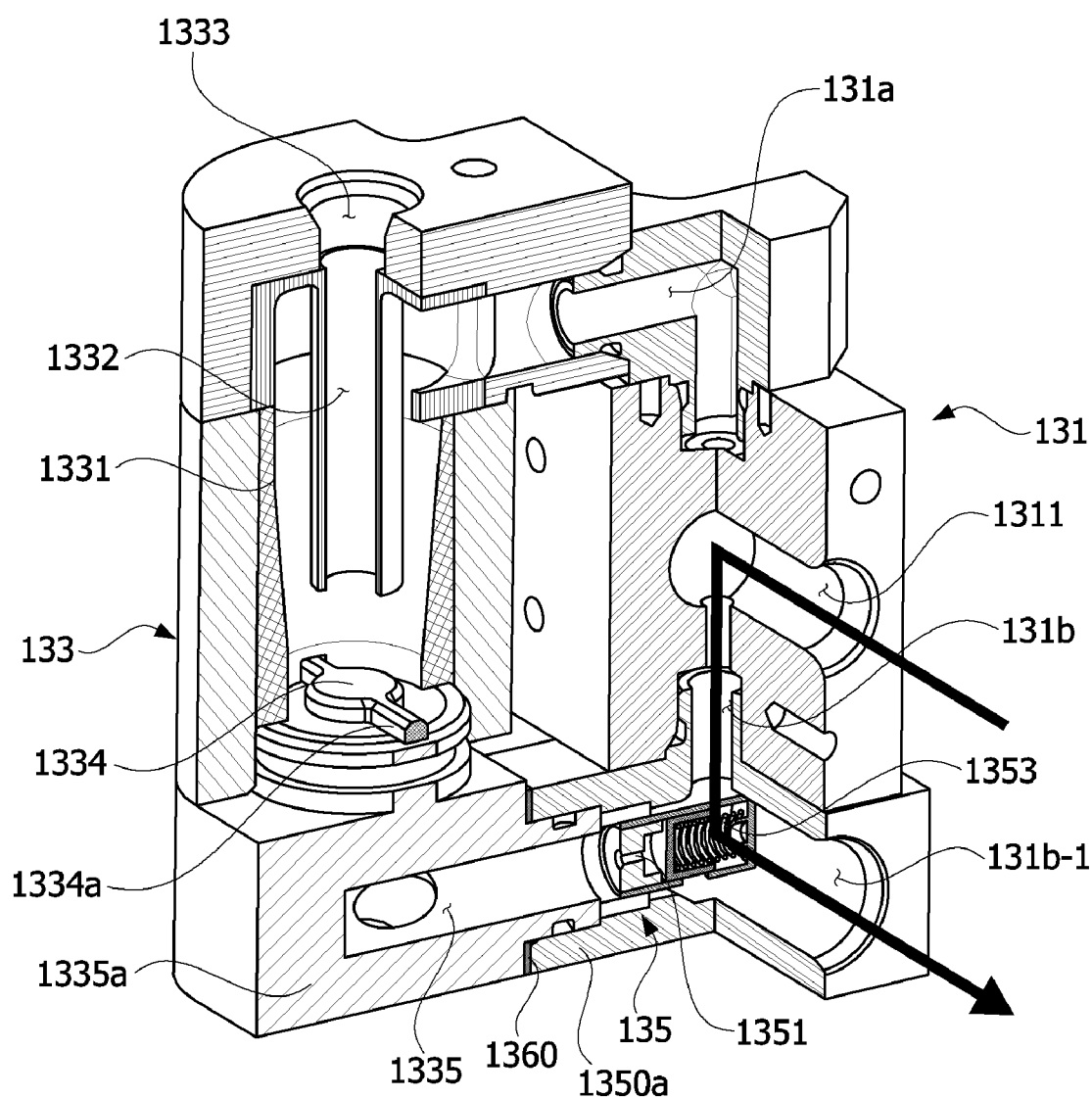
FIG. 14 is a view illustrating an operation of the refrigerant in a heating mode in FIG. 1.

FIG. 14 is a view illustrating an operation of the refrigerant in a heating mode in FIG. 1.

Referring to FIG. 14, in the heating mode, the refrigerant is introduced through the inlet port 1311, and the introduced refrigerant flows through the inflow hole 1313*b* of the ball valve 1313. In this case, the ball valve 1313 is rotated by the actuator 1370, such that the expansion groove 1313*d* is disposed to be directed toward the second line 131*b*. The refrigerant expands while passing through the outflow hole 1313*c* and the expansion groove 1313*d*, flows to the second line 131*b*, and then flows out through the first outlet port 131*b*-1.

Figure 15:
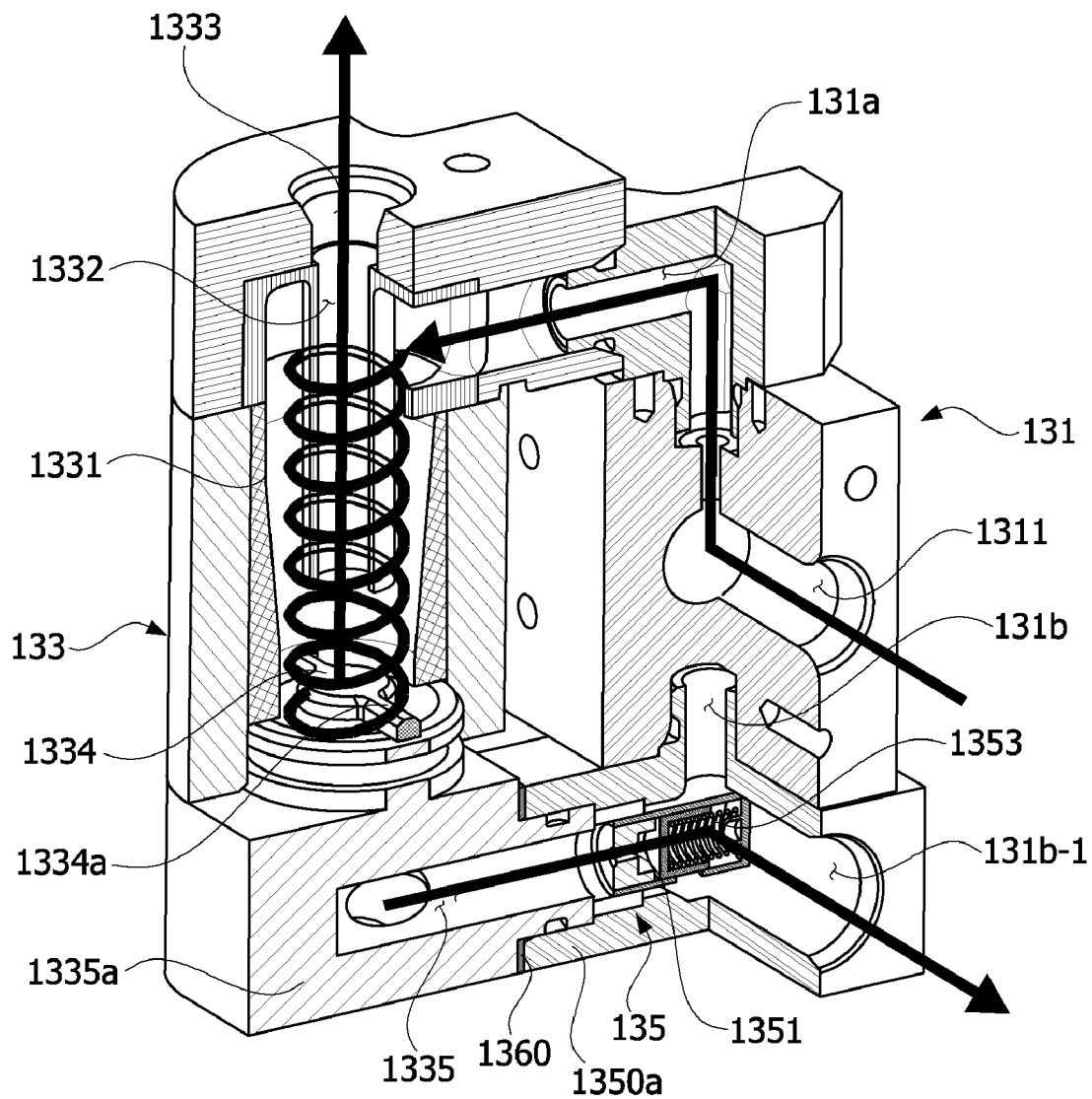
FIG. 15 is a view illustrating an operation of the refrigerant in an injection heating mode in FIG. 1.

FIG. 15 is a view illustrating an operation of the refrigerant in an injection heating mode in FIG. 1.

Referring to FIG. 15, in the injection heating mode, the refrigerant is introduced through the inlet port 1311, and the introduced refrigerant flows through the inflow hole 1313*b* of the ball valve 1313. In this case, the ball valve 1313 is rotated by the actuator 1370, such that the expansion groove 1313*d* is disposed to be directed toward the first line 131*a*. The refrigerant primarily expands while passing through the outflow hole 1313*c* and the expansion groove 1313*d* and flows to the first line 131*a*.

The refrigerant flowing to the first line 131*a* is discharged toward the sidewall of the housing 1331 of the gas-liquid separator 133, and the discharged refrigerant flows downward while rotating.

The gaseous refrigerant separated in the gas-liquid separator 133 flows to the second outlet port 1333 while flowing upward along the second outflow passageway 1332.

In addition, the liquid refrigerant flows through the movement passage 1335. In this case, the partition wall part 1334 may prevent the scattering refrigerant from flowing into the outflow passageway 1332.

The refrigerant flowing through the movement passage 1335 secondarily expands through the orifice 1351 of the second expansion means 135. The check valve 1353 is opened by pressure, such that the refrigerant flows to the first outlet port 131*b*-1.

Meanwhile, a heat pump system using a vapor injection module according to another embodiment of the present invention will be described below with reference to the accompanying drawings. A description of the configuration identical to the configuration of the vapor injection module according to the above-mentioned embodiment of the present invention will be omitted.

A vapor injection heat pump system according to another embodiment of the present invention will be described with reference to FIGS. 16 to 24. Like reference numerals indicated in FIGS. 1 to 9 refers to like members in the description with reference to FIGS. 10 to 18, and the detailed description of the identical members will be omitted.

Figure 16:
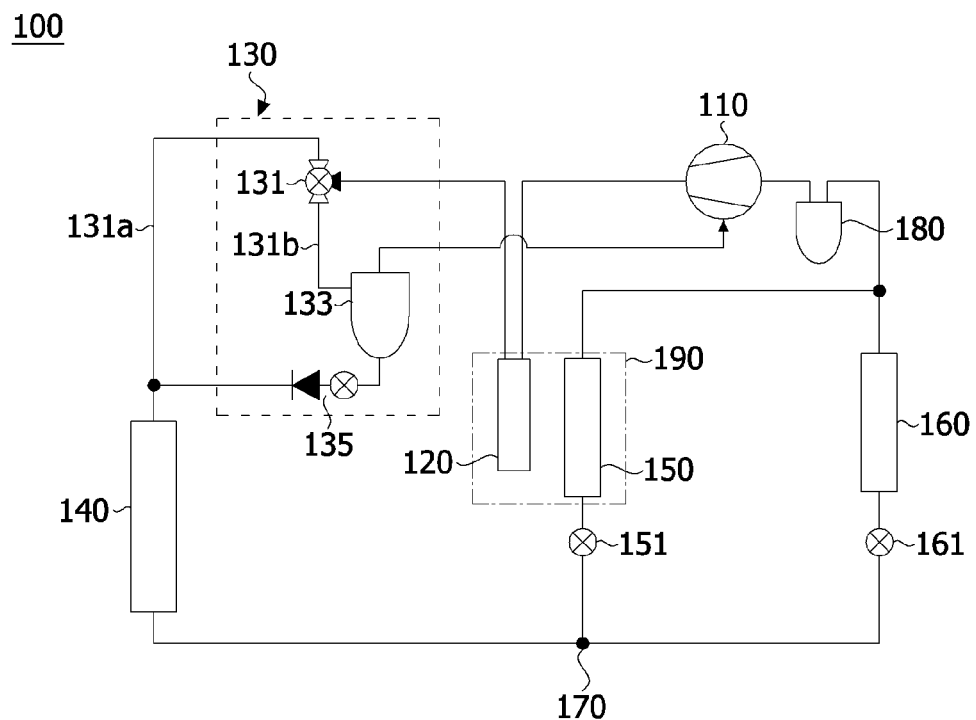
FIG. 16 is a view illustrating a first embodiment of a refrigerant circulation line in a heat pump system using a vapor injection module according to another embodiment of the present invention.
Figure 17:
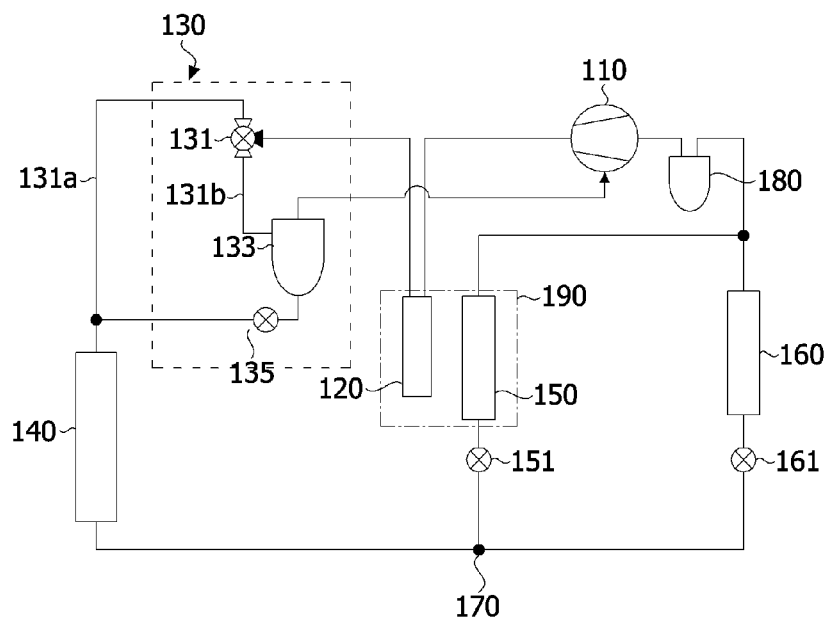
FIG. 17 is a view illustrating a first embodiment of a gas injection module which is the component illustrated in FIG. 16.
Figure 18:
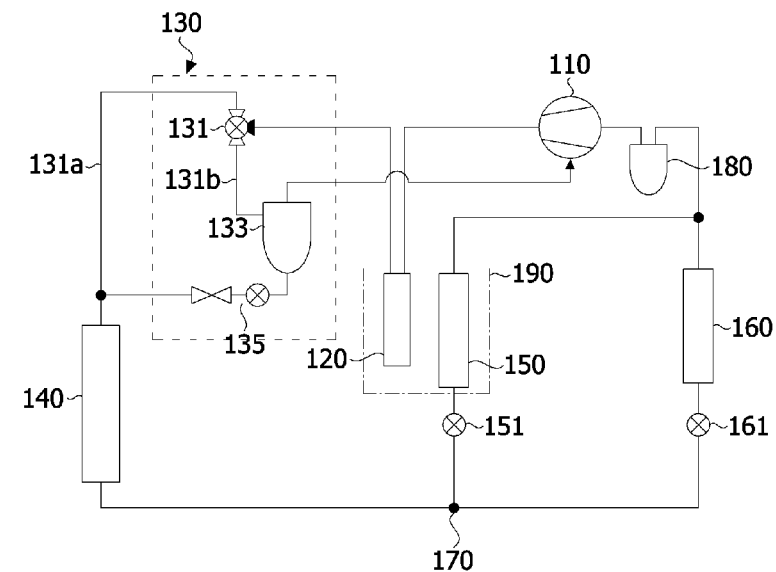
FIG. 18 is a second embodiment of the gas injection module which is the component illustrated in FIG. 16.

FIG. 16 is a view illustrating a first embodiment of a refrigerant circulation line in the heat pump system using the vapor injection module according to another embodiment of the present invention, FIG. 17 is a view illustrating a first embodiment of a gas injection module which is the component illustrated in FIG. 16, and FIG. 18 is a second embodiment of the gas injection module which is the component illustrated in FIG. 16.

Referring to FIGS. 16 to 18, the refrigerant circulation line of the heat pump system according to the embodiment of the present invention may include a compressor 110, a condenser 120, a vapor injection module 130, an exterior heat exchanger 140, a third expansion means 151, an evaporator 150, an accumulator 180, and an interior heat exchanger 213.

The compressor 110 operates by receiving power from an engine (internal combustion engine) or a motor. The compressor 110 sucks the refrigerant, compresses the refrigerant into a high-temperature, high-pressure gaseous refrigerant, and then discharges the refrigerant to the condenser 120.

The condenser 120 serves as a condenser in both the cooling mode and the heating mode. The condenser 120 may condense the compressed refrigerant. The refrigerant flowing through the condenser 120 exchanges heat with a coolant in a coolant circulation line 200 to be described below and then is supplied to the vapor injection module 130. As described above, the coolant heated by the refrigerant in the condenser 120 may be supplied to the interior heat exchanger 213 through the coolant circulation line 200. In one embodiment, a water-cooled condenser 120 may be used as the condenser 120.

The condenser 120, together with the evaporator 150, may be disposed in an air conditioning casing 190 and cool or heat a vehicle interior.

The vapor injection module 130 may determine the flow direction of the refrigerant and whether to expand the refrigerant having passed through the condenser 120 depending on the air conditioning mode. The vapor injection module 130 will be described below.

The exterior heat exchanger 140 is an air-cooled heat exchanger and is installed at a front side of an engine room of the vehicle. The exterior heat exchanger 140 and the radiator 231 are disposed in a straight line in a flow direction of air blown by a blower fan. In addition, the exterior heat exchanger 140 may exchange heat with the low-temperature coolant discharged from the radiator 231.

In addition, in the cooling mode, the exterior heat exchanger 140 serves as the condenser 120 identical to the water-cooled condenser 120. In the heating mode, the exterior heat exchanger 140 serves as the evaporator 150 that performs a different function from the water-cooled condenser 120.

The third expansion means 151 may be disposed at a side adjacent to an inlet of the evaporator 150 and perform functions of expanding the refrigerant, controlling the flow rate, and controlling the opening and closing operations.

The evaporator 150 is installed in the air conditioning casing 190 and disposed in the refrigerant circulation line 100. During a process in which the low-temperature, low-pressure refrigerant discharged from the third expansion means 151 is supplied to the evaporator 150 and air flowing in the air conditioning casing 190 by the blower passes through the evaporator 150, the air exchanges heat with the low-temperature, low-pressure refrigerant in the evaporator 140 and is converted into cold air. Then, the cold air is discharged into the vehicle interior and cools an occupant compartment. That is, the evaporator 150 serves as the evaporator 150 in the refrigerant circulation line 100.

The accumulator 180 is installed in the refrigerant circulation line 100 at a side adjacent to an inlet of the compressor 110. The refrigerant having passed through the evaporator 150 and/or the chiller 160 merges in the accumulator 180. The accumulator 180 may separate the refrigerant into a liquid refrigerant and a gaseous refrigerant, supply only the gaseous refrigerant to the compressor 110, and store the surplus refrigerant. A suction port of the compressor may be connected to a gaseous refrigerant outlet of the accumulator 180. Therefore, it is possible to prevent the liquid refrigerant from being sucked into the compressor 110.

The fourth expansion means 161 may be connected to the third expansion means 151 in parallel and perform functions of expanding the circulating refrigerant, controlling the flow rate, and controlling the opening and closing operations.

The low-temperature, low-pressure refrigerant discharged from the fourth expansion means 161 is supplied to the chiller 160 and exchanges heat with the coolant discharged from a second direction switching valve 232. Meanwhile, the cold coolant made by heat exchange in the chiller 160 may circulate through the coolant circulation line 200 and exchange heat with the high-temperature battery 235. That is, the battery 235 exchanges heat with the coolant instead of exchanging heat with the refrigerant.

The vapor injection module 130 may include the first expansion means 131, the gas-liquid separator 133, and the second expansion means 135.

The first expansion means 131 may determine the flow direction of the refrigerant introduced from the condenser 120. The operation of opening or closing the first expansion means 131 may be controlled by output voltage outputted from the control unit.

In one embodiment, a 3/2-way expansion means may be used as the first expansion means 131. The 3/2-way expansion means may determine the flow direction of the introduced refrigerant, determine whether to expand the refrigerant, and control the flow rate.

The 3/2-way expansion means may be connected to the first line 131a connected to the exterior heat exchanger 140 and the second line 131b connected to the gas-liquid separator 133.

The gas-liquid separator 133 may separate the refrigerant having passed through the 3/2-way expansion means into a gaseous refrigerant and a liquid refrigerant, move the separated liquid refrigerant to the exterior heat exchanger 140, and move the gaseous refrigerant to the compressor 110 again.

Like the accumulator 180 disposed before the refrigerant circulates through the refrigerant line and flows into the compressor 110, the gas-liquid separator 133 may serve to separate the refrigerant into the gaseous refrigerant and the liquid refrigerant. However, there is a difference in that the accumulator 180 supplies the gaseous refrigerant to the compressor 110, whereas the gas-liquid separator 133 allows the separated liquid refrigerant to flow as it is.

The liquid refrigerant separated by the gas-liquid separator 133 passes through the second expansion means 135 disposed in the second line 131b. In this case, the second expansion means 135 may additionally decompress the liquid refrigerant separated by the gas-liquid separator 133.

An orifice integrated check valve, an electronic expansion means, or an orifice integrated shut-off valve may be used as the second expansion means 135 illustrated in FIGS. 16 to 18.

In the first embodiment of the present invention, the first expansion means 131, the second expansion means 135, the third expansion means 151, and the fourth expansion means 161 may perform expansion, communication, and blocking functions according to the respective modes. In other words, the respective expansion means may three functions of expanding the refrigerant, allowing the refrigerant to pass without being expanded, and blocking the refrigerant.

An operation of the vapor injection module 130 in the refrigerant line of the heat pump system according to the embodiment of the present invention will be described.

The refrigerant having passed through the condenser 120 is decompressed and expanded in the first expansion means 131 and converted into the low-pressure refrigerant, and the refrigerant flows along the second line 131b and is injected into the gas-liquid separator 133. The refrigerant injected into the gas-liquid separator 133 is separated into the gaseous refrigerant and the liquid refrigerant. The gaseous refrigerant may be injected in a direction toward the compressor 110. The liquid refrigerant may be additionally decompressed and expanded while passing through the second expansion means 135 and injected into the exterior heat exchanger 140.

According to the refrigerant circulation line 100 using the vapor injection module 130, the gaseous refrigerant with a relatively higher temperature than the refrigerant introduced through the accumulator 180 is introduced into the compressor 110 again, such that the heating performance may be improved. Further, only the liquid refrigerant flows to the exterior heat exchanger, such that an evaporation temperature may be increased in the exterior heat exchanger, and the heat exchange efficiency may be improved.

Figure 19:
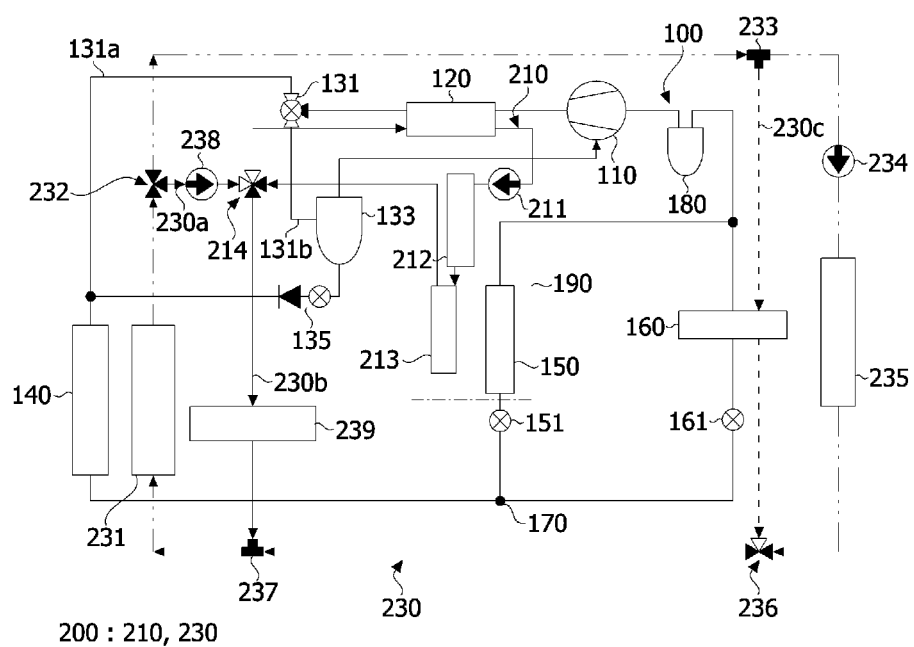
FIG. 19 is a structural view of a vapor injection heat pump system according to the embodiment of the present invention.

FIG. 19 is a structural view of a vapor injection heat pump system according to the embodiment of the present invention.

Referring to FIG. 19, the vapor injection heat pump system according to the embodiment of the present invention may include the refrigerant circulation line and the coolant circulation line.

The refrigerant circulation line described with reference to FIGS. 16 to 18 may be applied to the refrigerant circulation line described with reference to FIG. 19. In addition, FIGS. 16 to 18 illustrate that the condenser 120 performs the heat exchange in the air conditioning casing 190, but the present invention is not limited thereto. The heat exchange may be performed by using the interior heat exchanger that performs the heat exchange using the coolant.

The coolant circulation line 200 may include a heating line 210 configured to heat the vehicle interior, and a cooling line 230 configured to cool an electrical component 239 and the battery 235.

The heating line 210 may include the water-cooled condenser 120, a first pump 211, a coolant heater 212, the interior heat exchanger 213, and a first direction switching valve 214.

As described above, the refrigerant and the coolant may exchange heat with each other while passing through the water-cooled condenser 120.

The first pump 211 is a means for pumping the coolant so that the coolant circulates along the heating line 210. The first pump 211 may be installed in the coolant line and disposed rearward of the water-cooled condenser 120 based on the flow direction of the coolant.

The coolant heater 212 refers to a device for heating the coolant. The coolant heater 212 may be connected and disposed rearward of the first pump 211 and forward of the interior heat exchanger 213 based on the flow direction of the coolant. Further, the coolant heater 212 may operate when a temperature of the coolant is equal to or lower than a particular temperature. Various components such as an induction heater, a sheath heater, a PTC heater, or a film heater capable of generating heat using electric power may be used as the coolant heater.

The interior heat exchanger 213 may be disposed in the air conditioning casing 190 of the vehicle. The air flowing by the air blower may be heated while passing through the interior heat exchanger 213, supplied to the vehicle interior, and used to heat the vehicle interior. Further, the interior heat exchanger 213 may be connected and disposed rearward of the coolant heater 212 based on the flow direction of the coolant.

The first direction switching valve 214 may be installed between the interior heat exchanger 213 and the water-cooled condenser 120 and configured to selectively connect or disconnect the heating line 210 and the cooling line 230 to be described below. More specifically, the first direction switching valve 214 may be installed in the heating line 210. Two coolant line pipes may be connected to the first direction switching valve 214. The single first connection line 230a branching off from one side of the cooling line 230 may be connected to the first direction switching valve 214. The single second connection line 230b branching off from the other side of the cooling line 230 may be connected to the first direction switching valve 214. That is, four coolant lines may be connected to the first direction switching valve 214 so as to meet together. The first direction switching valve 214 may be a 4-way direction switching valve capable of adjusting states in which the four coolant lines are connected to or disconnected from one another.

The cooling line 230 may include the radiator 231 for the electrical component, the second direction switching valve 232, a second pump 238, the first direction switching valve 214, the electrical component 239, a first coolant joint 233, a second coolant joint 237, a third pump 234, the battery 235, the chiller 160, and a third direction switching valve 236.

The radiator 231 for the electrical component cools the coolant having exchanged heat with the electrical component 239 or the battery 235. The radiator 231 for the electrical component may be cooled by a cooling fan in an air-cooled manner.

The second direction switching valve 232 may be installed in the cooling line 230. Two coolant pipes may be connected to the second direction switching valve 232. The first direction switching valve 214 and the second direction switching valve 232 may be connected by the first connection line 230a so that the heating line 210 and the cooling line 230 are connected. That is, three coolant lines may be connected to the second direction switching valve 232 so as to meet together. The second direction switching valve 232 may be a 3-way direction switching valve capable of adjusting states in which the three coolant lines are connected to or disconnected from one another.

The second pump 238 is a means for pumping the coolant so that the coolant circulates along the cooling line 230. Further, the second pump 238 is installed in the first connection line 230a and disposed between the first direction switching valve 214 and the second direction switching valve 232. The operation of the second pump 238 may allow the coolant to flow from the second direction switching valve 232 to the first direction switching valve 214.

The first direction switching valve 214 is as described above with reference to the heating line 210.

The electrical component 239 is disposed in the second connection line 230b that connects the first direction switching valve 214 and the second coolant joint. The electrical component 239 may be cooled by the coolant. In one embodiment, various components such as a drive motor, an inverter, and a charger (onboard charger (OBC)), which generate heat, may be used as the electrical component 239.

The third pump 234 is a means for pumping the coolant so that the coolant circulates along the cooling line 230. Further, the third pump 234 is installed in the coolant line and disposed between the first coolant joint and the battery 235, such that the coolant may flow from the third pump 234 to the battery 235.

The battery 235 serves as a power source for the vehicle. The battery 235 may serve as a driving source for various types of electrical components 239 in the vehicle. Alternatively, the battery 235 may be connected to a fuel cell and serve to store electricity. Alternatively, the battery 235 may serve to store electricity supplied from the outside. Further, the battery 235 may be disposed in the coolant line and provided between the third pump 234 and the third direction switching valve 236. Therefore, the battery 235 may be cooled or heated by exchanging heat with the flowing coolant.

The first coolant joint 233 is installed in the coolant line and disposed rearward of the second direction switching valve 232 based on the flow direction of the coolant. Three coolant lines are connected to the first coolant joint 233 so as to meet together. That is, the first coolant joint 233 may be installed such that two opposite sides thereof are connected to the cooling line 230, and a third connection line 230c may be connected to a lower side of the first coolant joint 233. In this case, the third connection line 230c may be connected to pass through the chiller 160.

The second coolant joint 237 may be installed at a point at which a rear end of the second connection line 230b meets the cooling line 230. Three coolant lines are connected to the second coolant joint 237 so as to meet together. That is, the second coolant joint 237 may be installed such that two opposite sides thereof are connected to the cooling line 230, and a second connection line 230b may be connected to an upper side of the second coolant joint 237.

The chiller 160 is as described above with reference to the heating line 210.

The third direction switching valve 236 may be installed in the coolant line and disposed between the battery 235 and the second coolant joint 237. Two coolant pipes may be connected to the third direction switching valve 236. The third connection line 230c may be connected to an upper side of the third direction switching valve 236, such that the battery 235 and the third connection line 230c may be connected in parallel. In this case, the third direction switching valve 236 may be a 3-way direction switching valve capable of adjusting states in which the three coolant lines are connected to or disconnected from one another.

Further, the air blower (not illustrated) may be installed at one side of the air conditioning casing 190 to blow air. A temperature adjustment door (not illustrated) may be installed in the air conditioning casing 190. In addition, the evaporator 150 and the interior heat exchanger 213 disposed in the air conditioning casing 190 may be disposed and configured such that on the basis of the operation of the temperature adjustment door (not illustrated), the air discharged from the air blower (not illustrated) may flow into the vehicle interior while passing only through the evaporator 150 or flow into the vehicle interior while passing through the evaporator 150 and the interior heat exchanger 213. The configuration of the air conditioning casing 190 is not limited to the configuration illustrated in the drawings, and the air conditioning casing 190 may be modified to have various structures.

Hereinafter, the operating modes of the heat pump system will be described with reference to FIGS. 20 to 24.

Figure 20:
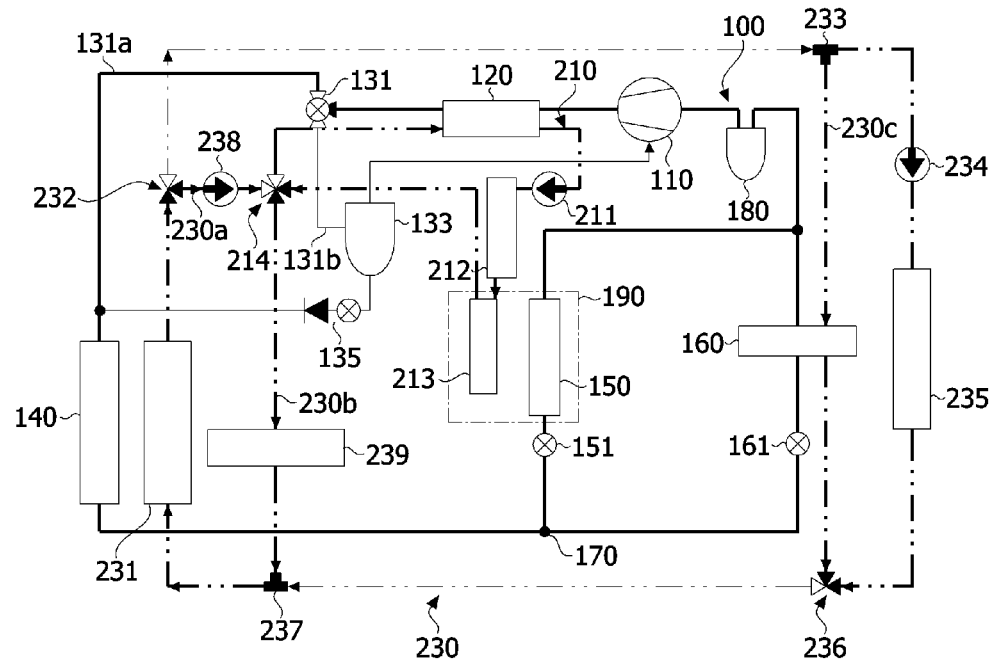
FIG. 20 is a view illustrating an operating state of the system in a maximum cooling mode in FIG. 19.

FIG. 20 is a view illustrating an operating state of the system in a maximum cooling mode in FIG. 19.

Referring to FIG. 20, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the water-cooled condenser 120.

Next, the refrigerant cooled in the water-cooled condenser 120 passes through the first expansion means 131, which is fully opened toward the exterior heat exchanger 140, and flows into the exterior heat exchanger 140. The refrigerant is cooled by exchanging heat with outside air in the exterior heat exchanger 140. That is, both the water-cooled condenser 120 and the exterior heat exchanger 140 serve as the condenser 120 and condense the refrigerant.

Thereafter, the condensed refrigerant is throttled and expanded while passing through the third expansion means 151. Thereafter, the expanded refrigerant passes through the evaporator 150 while exchanging heat with the air blown by the air blower (not illustrated) of the air conditioning casing 190, such that the refrigerant is evaporated, and the air is cooled. The cooled air is supplied to the vehicle interior and used to cool the vehicle interior. Further, the refrigerant evaporated in the evaporator 150 flows into the compressor 110 again via the accumulator 180.

In addition, the remaining part of the refrigerant divided in a refrigerant branch part 170 is throttled and expanded while passing through the third expansion means 161. Thereafter, the expanded refrigerant is evaporated by exchanging heat with the coolant while passing through the chiller 160, such that the coolant may be cooled. Further, the refrigerant evaporated in the chiller 160 flows into the compressor 110 again via the accumulator 180. As described above, the refrigerant having passed through the evaporator 150 and the refrigerant having passed through the chiller 160 merge with each other in the accumulator 180 and flow into the compressor 110. The refrigerant circulates as the above-mentioned process is repeated.

Meanwhile, the coolant in the coolant circulation line 200 is circulated by the operations of the first pump 211, the second pump 238, and the third pump 234. Further, the battery 235 and the electrical component 239 may be cooled by the coolant and the refrigerant passing through the water-cooled condenser 120. The heated coolant may be cooled while exchanging heat with the outside air by the operation of the cooling fan (not illustrated) of the radiator 231 for the electrical component. In this case, the first direction switching valve 214 and the second direction switching valve 232 may adjust the directions thereof so that the heating line 210 and the cooling line 230 are connected. More specifically, the coolant may flow as the upper side and the left side of the first direction switching valve 214 are connected to each other, and the coolant may flow as the lower side and the right side of the first direction switching valve 214 are connected to each other. Further, when the left side and the lower side of the second direction switching valve 232 are connected to each other, the coolant may flow, and the right side of the second direction switching valve 232 may be disconnected. In addition, the upper side and the right side of the third direction switching valve 236 may be connected to each other, and the left side of the third direction switching valve 236 may be closed.

Therefore, the coolant flows from the radiator 231 for the electrical component sequentially to the second direction switching valve 232, the second pump 238, the first direction switching valve, the water-cooled condenser 120, the first pump 211, the coolant heater 212, the interior heat exchanger 213, the first direction switching valve 214, the electrical component 239, and the second coolant joint, flows into the radiator 231 for the electrical component again, and circulates. This cycle is repeated. In this case, the second direction switching valve 232 may prevent the coolant from flowing from the second direction switching valve 232 to the first coolant joint, and the third direction switching valve 236 may prevent the coolant from flowing from the third direction switching valve 236 to the second coolant joint 237. In addition, the coolant flows from the chiller 160 sequentially to the first coolant joint, third pump 234, the battery 235, and the third direction switching valve 236, flows into the chiller 160, and circulates. This cycle is repeated. That is, the battery 235 and the chiller 160 may define a separate closed loop, in which the coolant circulates, in the cooling line 230 by the second direction switching valve 232 and the third direction switching valve 236, such that the battery 235 may be separately cooled.

In this case, the maximum cooling mode may operate when a temperature of the outside air is within a range of 30 to 45 degrees Celsius. In this case, the compressor 110 may operate at a maximum rotational speed. Further, when the battery 235 needs not to be cooled, the fourth expansion means 161 may be closed, such that the refrigerant may not flow to the chiller 160. In this case, the third pump 234 may not operate.

Figure 21:
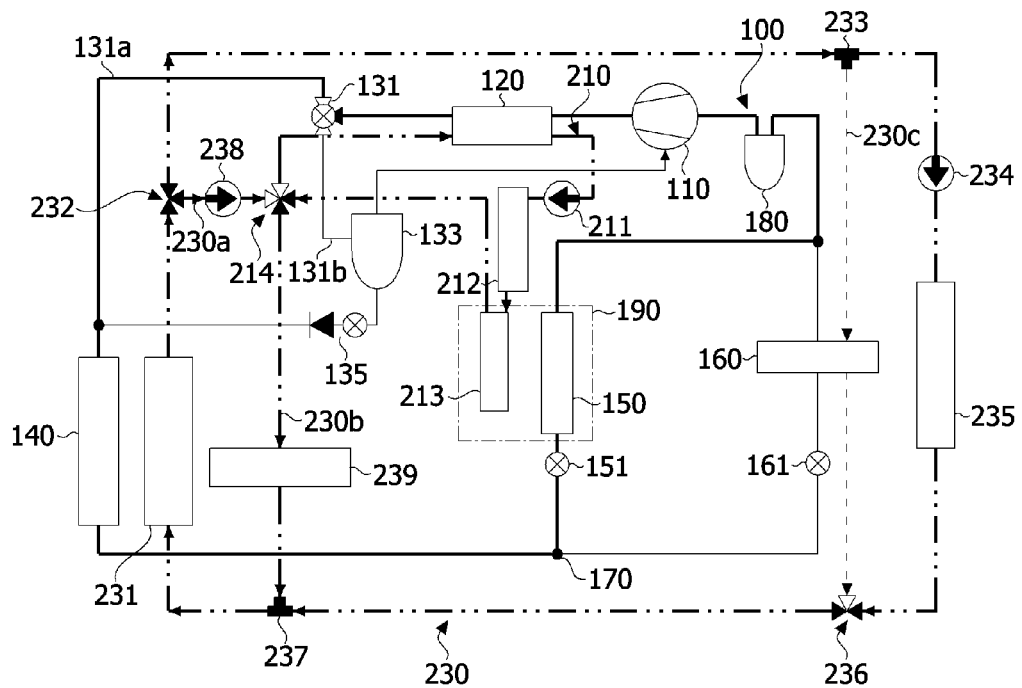
FIG. 21 is a view illustrating an operating state of the system in a mild cooling mode in FIG. 19.

FIG. 21 is a view illustrating an operating state of the system in a mild cooling mode in FIG. 19.

Referring to FIG. 21, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the water-cooled condenser 120. Next, the refrigerant cooled in the water-cooled condenser 120 passes through the first expansion means 131, which is fully opened toward the exterior heat exchanger 140, and flows into the exterior heat exchanger 140. The refrigerant is cooled by exchanging heat with outside air in the exterior heat exchanger 140. That is, both the water-cooled condenser 120 and the exterior heat exchanger 140 serve as the condenser 120 and condense the refrigerant. Thereafter, the condensed refrigerant passes through the refrigerant branch part 170 and is throttled and expanded while passing through the third expansion means 151. Thereafter, the expanded refrigerant passes through the evaporator 150 while exchanging heat with the air blown by the air blower (not illustrated) of the air conditioning casing 190, such that the refrigerant is evaporated, and the air is cooled. The cooled air is supplied to the vehicle interior and used to cool the vehicle interior. Further, the refrigerant evaporated in the evaporator 150 flows into the compressor 110 again via the accumulator 180. In this case, the fourth expansion valve 161 is closed, such that the refrigerant may not flow to the chiller 160.

The refrigerant having passed through the evaporator 150 flows into the compressor 110 via the accumulator 180. The refrigerant circulates as the above-mentioned process is repeated.

Meanwhile, the coolant in the coolant circulation line 200 is circulated by the operations of the first pump 211, the second pump 238, and the third pump 234. Further, the battery 235 and the electrical component 239 may be cooled by the coolant and the refrigerant passing through the water-cooled condenser 120. The heated coolant may be cooled while exchanging heat with the outside air by the operation of the cooling fan (not illustrated) of the radiator 231 for the electrical component. In this case, the first direction switching valve 214 and the second direction switching valve 232 may adjust the directions thereof so that the heating line 210 and the cooling line 230 are connected. More specifically, the coolant may flow as the upper side and the left side of the first direction switching valve 214 are connected to each other, and the coolant may flow as the lower side and the right side of the first direction switching valve 214 are connected to each other. Further, all the three directions, i.e., the left side, the lower side, and the right side of the second direction switching valve 232 are connected, such that the coolant may flow. In addition, the left side and the right side of the third direction switching valve 236 may be connected to each other, and the upper side of the third direction switching valve 236 may be closed.

Therefore, the coolant flows from the radiator 231 for the electrical component sequentially to the second direction switching valve 232, the second pump 238, the first direction switching valve, the water-cooled condenser 120, the first pump 211, the coolant heater 212, the interior heat exchanger 213, the first direction switching valve 214, the electrical component 239, and the second coolant joint 237, flows into the radiator 231 for the electrical component again, and circulates. This cycle is repeated. In this case, by the second direction switching valve 232, a part of the coolant flows to the right side, sequentially passes through the first coolant joint 233, the third pump 234, the battery 235, the third direction switching valve 236, and the second coolant joint 237, flows into the radiator 231 for the electrical component, and circulates. This cycle is repeated. In this case, the coolant having passed through the electrical component 239 and the coolant having passed through the battery 235 may merge with each other in the second coolant joint 237 and flow into the radiator 231 for the electrical component.

In this case, the mild cooling mode may operate when a temperature of the outside air is within a range of 15 to 25 degrees Celsius. In this case, the battery 235 may be cooled by the radiator 231 for the electrical component, such that the refrigerant needs not to circulate toward the chiller 160. Therefore, it is possible to reduce power required to operate the compressor 110.

Figure 22:
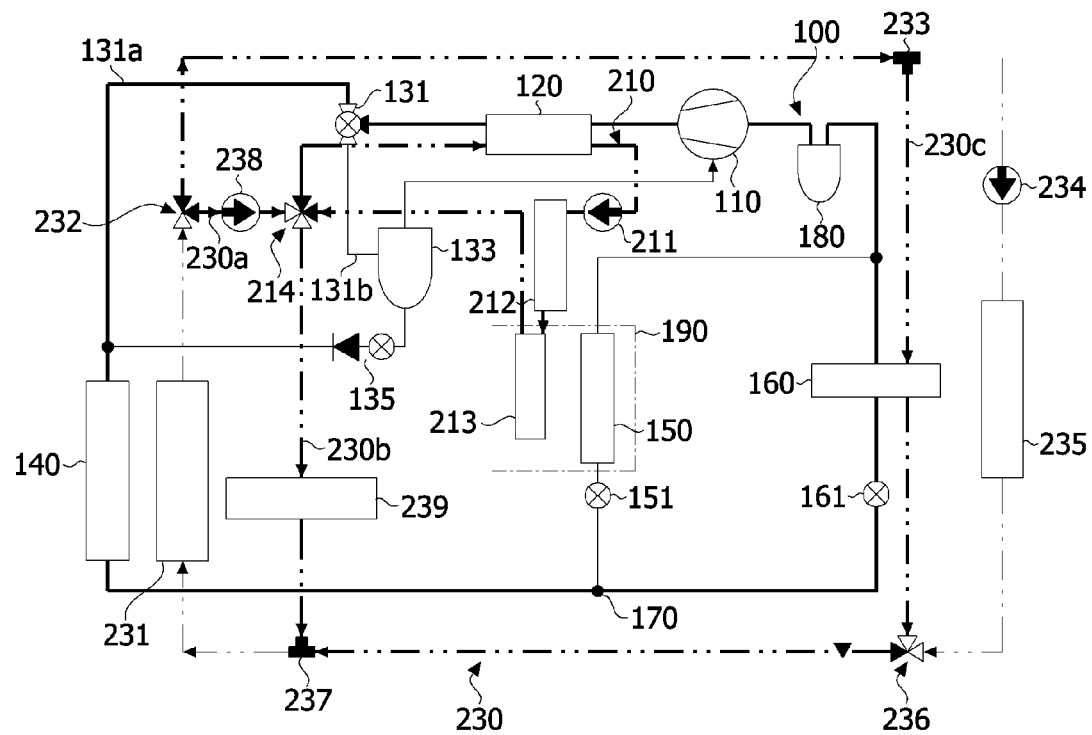
FIG. 22 is a view illustrating an operating state of the system in a non-vapor injection heating mode in FIG. 19.

FIG. 22 is a view illustrating an operating state of the system in a non-vapor injection heating mode in FIG. 19.

Referring to FIG. 16, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the water-cooled condenser 120. Next, the refrigerant cooled in the water-cooled condenser 120 is throttled and expanded while passing through the first expansion means 131, and the expanded refrigerant is evaporated by exchanging heat with the outside air while passing through the exterior heat exchanger 140 and absorbs heat of the outside air. Thereafter, the refrigerant passes through the refrigerant branch part 170 and the fully opened fourth expansion means 161 and flows into the chiller 160. In the chiller 160, the refrigerant may be heated by exchanging heat with the coolant. Next, the refrigerant having passed through the chiller 160 flows into the compressor 110 again via the accumulator 180. In this case, the third expansion means 151 is closed, such that the refrigerant may not flow to the evaporator 150. Therefore, the refrigerant circulates as the above-mentioned process is repeated.

Meanwhile, the coolant in the coolant circulation line 200 is circulated by the operations of the first pump 211 and the second pump 238. Further, the coolant may be heated while passing through the water-cooled condenser 120, heated by the coolant heater 212, and heated by waste heat of the electrical component 239. The coolant may be cooled while passing through the chiller 160. In this case, the first direction switching valve 214 and the second direction switching valve 232 may adjust the directions so that the heating line 210 and the cooling line 230 are separated.

More specifically, the coolant may flow as the upper side and the right side of the first direction switching valve 214 are connected to each other, and the coolant may flow as the lower side and the left side of the first direction switching valve 214 are connected to each other. Further, when the right side and the lower side of the second direction switching valve 232 are connected to each other, the coolant may flow, and the left side of the second direction switching valve 232 may be disconnected. In addition, the upper side and the left side of the third direction switching valve 236 may be connected to each other, and the right side of the third direction switching valve 236 may be closed.

Therefore, the coolant in the heating line 210 sequentially passes through the first pump 211, the coolant heater 212, the interior heat exchanger, the first direction switching valve, and the water-cooled condenser 120, flows into the first pump 211 again, and circulates. This cycle is repeated. Further, the coolant in the cooling line 230 separated from the heating line 210 flows from the second pump 238 sequentially to the first direction switching valve 214, the electrical component 239, the second coolant joint 237, the third direction switching valve 236, the chiller 160, the first coolant joint 233, and the second direction switching valve 232, flows into the second pump 238 again, and circulates. This cycle is repeated.

In this case, the second direction switching valve 232 may prevent the coolant from flowing from the second direction switching valve 232 to the second coolant joint 237 via the radiator 231 for the electrical component, and the third direction switching valve 236 may prevent the coolant from flowing from the third direction switching valve 236 to the first coolant joint 233 via the battery 235 and the third pump 234. Further, the coolant passes through the heater core while exchanging heat with the air blown by the air blower (not illustrated) of the air conditioning casing 190, such that the air is heated. The heated air is supplied to the vehicle interior and used to heat the vehicle interior.

Figure 23:
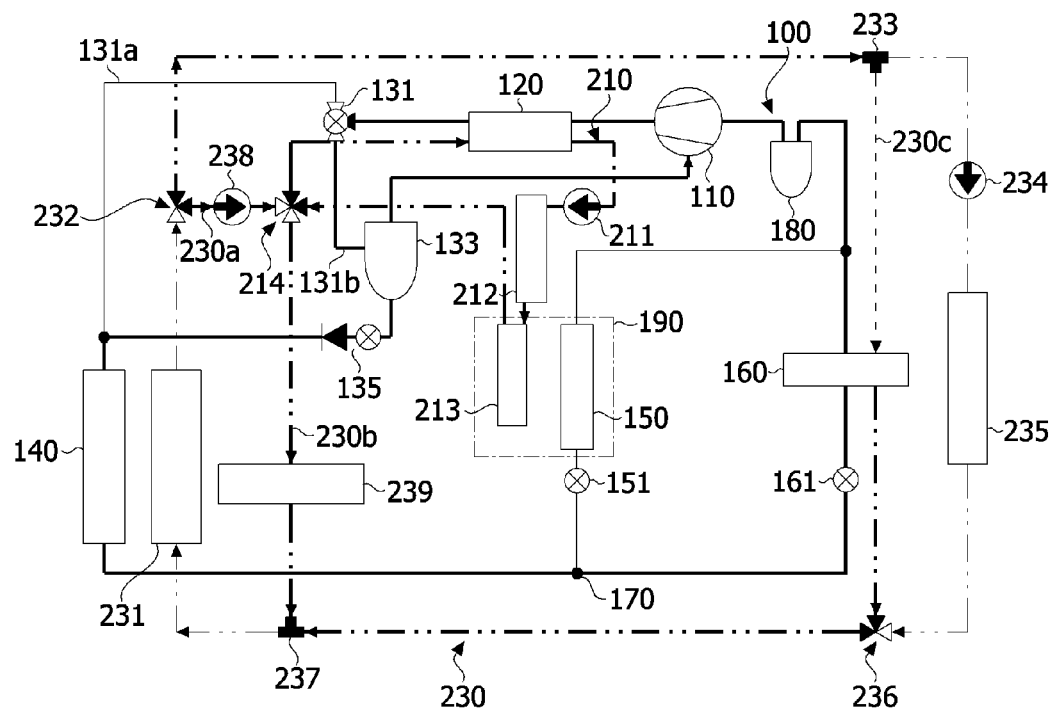
FIG. 23 is a view illustrating an operating state of the system in an injection heating mode in FIG. 19.

FIG. 23 is a view illustrating an operating state of the system in an injection heating mode in FIG. 19.

Referring to FIG. 23, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the water-cooled condenser 120. Next, the refrigerant cooled in the water-cooled condenser 120 is throttled and expanded while passing through the first expansion means 131, the expanded refrigerant flows to the gas-liquid separator 133 along the second line 131b connected to the first expansion means 131. The liquid refrigerant separated in the gas-liquid separator 133 may flow to the second expansion means 135 so as to be additionally decompressed and then be supplied to the exterior heat exchanger 140. The liquid refrigerant supplied to the exterior heat exchanger 140 increases the evaporation temperature and delays the frost, thereby improving the heat exchange efficiency.

In addition, the gaseous refrigerant separated in the gas-liquid separator 133 may flow into the compressor 110 again. Therefore, since the refrigerant with a higher temperature than the refrigerant introduced from the accumulator 180 may flow into the compressor 110 again, thereby improving the heating efficiency.

Thereafter, the refrigerant is evaporated by exchanging heat with the outside air while passing through the exterior heat exchanger 140 and absorbs heat of the outside air. Thereafter, the refrigerant passes through the refrigerant branch part 170 and the fully opened fourth expansion means 161 and flows into the chiller 160. In the chiller 160, the refrigerant may be heated by exchanging heat with the coolant. Next, the refrigerant having passed through the chiller 160 flows into the compressor 110 again via the accumulator 180. In this case, the third expansion means 151 is closed, such that the refrigerant may not flow to the evaporator 150. Therefore, the refrigerant circulates as the above-mentioned process is repeated.

Meanwhile, the coolant in the coolant circulation line 200 is circulated by the operations of the first pump 211 and the second pump 238. Further, the coolant may be heated while passing through the water-cooled condenser 120, heated by the coolant heater 212, and heated by waste heat of the electrical component 239. The coolant may be cooled while passing through the chiller 160. In this case, the first direction switching valve 214 and the second direction switching valve 232 may adjust the directions so that the heating line 210 and the cooling line 230 are separated.

More specifically, the coolant may flow as the upper side and the right side of the first direction switching valve 214 are connected to each other, and the coolant may flow as the lower side and the left side of the first direction switching valve 214 are connected to each other. Further, when the right side and the lower side of the second direction switching valve 232 are connected to each other, the coolant may flow, and the left side of the second direction switching valve 232 may be disconnected. In addition, the upper side and the left side of the third direction switching valve 236 may be connected to each other, and the right side of the third direction switching valve 236 may be closed.

Therefore, the coolant in the heating line 210 sequentially passes through the first pump 211, the coolant heater 212, the interior heat exchanger, the first direction switching valve, and the water-cooled condenser 120, flows into the first pump 211 again, and circulates. This cycle is repeated. Further, the coolant in the cooling line 230 separated from the heating line 210 flows from the second pump 238 sequentially to the first direction switching valve 214, the electrical component 239, the second coolant joint 237, the third direction switching valve 236, the chiller 160, the first coolant joint 233, and the second direction switching valve 232, flows into the second pump 238 again, and circulates. This cycle is repeated.

In this case, the second direction switching valve 232 may prevent the coolant from flowing from the second direction switching valve 232 to the second coolant joint 237 via the radiator 231 for the electrical component, and the third direction switching valve 236 may prevent the coolant from flowing from the third direction switching valve 236 to the first coolant joint 233 via the battery 235 and the third pump 234. Further, the coolant passes through the heater core while exchanging heat with the air blown by the air blower (not illustrated) of the air conditioning casing 190, such that the air is heated. The heated air is supplied to the vehicle interior and used to heat the vehicle interior.

The injection heating mode may be set to operate under a low-temperature condition in comparison with the general heating mode. The temperature may be set to vary depending on the state of the vehicle or the environment.

Figure 24:
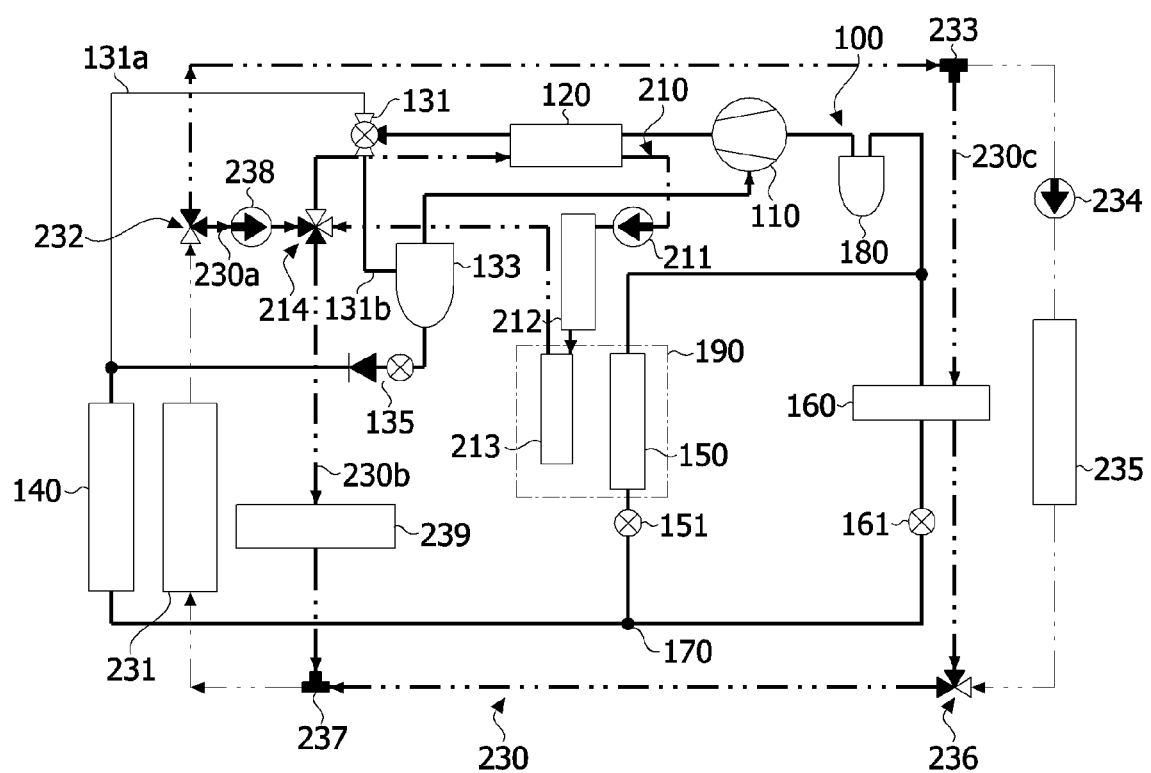
FIG. 24 is a view illustrating an operating state of the system in a dehumidifying heating mode in FIG. 19.

FIG. 24 is a view illustrating an operating state of the system in a dehumidifying heating mode in FIG. 19.

Referring to FIG. 24, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the water-cooled condenser 120. Next, the refrigerant cooled in the water-cooled condenser 120 is throttled and expanded while passing through the first expansion means 131, the expanded refrigerant flows to the gas-liquid separator 133 along the second line 131b connected to the first expansion means 131. The liquid refrigerant separated in the gas-liquid separator 133 may flow to the second expansion means 135 so as to be additionally decompressed and then be supplied to the exterior heat exchanger 140. The liquid refrigerant supplied to the exterior heat exchanger 140 increases the evaporation temperature and delays the frost, thereby improving the heat exchange efficiency.

In addition, the gaseous refrigerant separated in the gas-liquid separator 133 may flow into the compressor 110 again. Therefore, since the refrigerant with a higher temperature than the refrigerant introduced from the accumulator 180 may flow into the compressor 110 again, thereby improving the heating efficiency.

Thereafter, a part of the refrigerant, which passes through the interior heat exchanger 213 and divided in the refrigerant branch part 170, bypasses the third expansion means 151 and passes through the evaporator 150 while exchanging heat with the air blown by the air blower (not illustrated) of the air conditioning casing 190, such that moisture is removed from the air. Further, the refrigerant having passed through the evaporator 150 flows into the compressor 110 or 210 again via the accumulator 180. In addition, the remaining part of the refrigerant divided in the refrigerant branch part 170 bypasses the fourth expansion means 161. Thereafter, the refrigerant passes through the chiller 160, merges in the accumulator 180, and flows into the compressor 110. The refrigerant circulates as the above-mentioned process is repeated.

Meanwhile, the coolant in the coolant circulation line 200 is circulated by the operations of the first pump 211 and the second pump 238. Further, the coolant may be heated only by waste heat of the electrical component 239. In this case, the first direction switching valve 214 and the second direction switching valve 232 may adjust the directions so that the heating line 210 and the cooling line 230 are separated. More specifically, the coolant may flow as the upper side and the right side of the first direction switching valve 214 are connected to each other, and the coolant may flow as the lower side and the left side of the first direction switching valve 214 are connected to each other. Further, when the right side and the upper side of the second direction switching valve are connected to each other, the coolant may flow, and the lower side of the second direction switching valve may be closed. In addition, the left side and the upper side of the third direction switching valve 236 may be connected to each other, and the right of the third direction switching valve 236 may be closed.

Therefore, the coolant in the heating line 210 sequentially passes through the first pump 211, the coolant heater 212, the interior heat exchanger 213, the first direction switching valve, and the water-cooled condenser 120, flows into the first pump 211 again, and circulates. This cycle is repeated. Further, the coolant in the cooling line 230 separated from the heating line 210 flows from the second pump 238 sequentially to the first direction switching valve 214, the electrical component 239, the second coolant joint 237, the third direction switching valve 236, the chiller 160, the first coolant joint 233, and the second direction switching valve 232, flows into the second pump 238 again, and circulates. This cycle is repeated. In this case, the third direction switching valve 236 may prevent the coolant from flowing from the third direction switching valve 236 to the battery 235, the third pump 234, and the first coolant joint 233, and the second direction switching valve 232 may prevent the coolant from flowing from the second direction switching valve 232 to the second coolant joint 237 via the radiator 231 for the electrical component. In this case, the air dehumidified while passing through the evaporator 150 may be heated while passing through the interior heat exchanger 213 and used to heat the vehicle interior.

In this case, the dehumidifying heating mode may operate when a temperature of the outside air is within a range of 5 to 15 degrees Celsius.

The embodiment of the present invention has been specifically described above with reference to the accompanying drawings.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

The invention claimed is:

1. A vapor injection module comprising:
a first expansion valve having an inlet port into which a refrigerant is introduced, and first line and second line connected to the inlet port so that the introduced refrigerant flows therethrough, the first expansion valve being disposed at a connection portion between the first line and the second line and configured to control a flow direction of the refrigerant and whether to expand the refrigerant depending on an air conditioning mode;
a gas-liquid separator connected to the first line and configured to separate the introduced refrigerant into a liquid refrigerant and a gaseous refrigerant;
a second expansion valve connected to a movement passage through which the liquid refrigerant separated in the gas-liquid separator flows, the second expansion valve being configured to expand the introduced refrigerant; and a first outlet port connected to the second line and the second expansion valve, wherein the first expansion valve comprises a single ball valve configured to rotate and disposed at a center at which the inlet port, the first line, and the second line are connected.

2. The vapor injection module of claim 1, wherein the second expansion valve comprises:
an orifice configured to expand the refrigerant introduced through the movement passage; and
a check valve configured to determine whether to move the refrigerant.

3. The vapor injection module of claim 2, wherein a thermal insulation member is disposed between a first body portion in which the movement passage is disposed and a second body portion in which the orifice is disposed.

4. The vapor injection module of claim 1, wherein the gas-liquid separator comprises:
a housing having an internal space in which the refrigerant flows;
an outflow passageway disposed at an upper side of the housing and configured to discharge the gaseous refrigerant, the outflow passageway being provided in the form of a pipe to prevent the liquid refrigerant from flowing into the outflow passageway; and
the movement passage disposed at a lower side of the housing and configured to discharge the liquid refrigerant.

5. The vapor injection module of claim 4, wherein the first line connected to the housing is disposed to discharge the refrigerant toward a sidewall of the housing.

6. The vapor injection module of claim 4, wherein an inner wall of the housing has a cylindrical structure having an inclination.

7. The vapor injection module of claim 4, wherein a partition wall part is disposed at an end of the movement passage and prevents the refrigerant from scattering.

8. The vapor injection module of claim 7, wherein the partition wall part is larger than a diameter of the outflow passageway and prevents the scattering refrigerant from flowing to the outflow passageway.

9. The vapor injection module of claim 1, wherein the ball valve comprises:
an inflow hole connected to the inlet port;
an outflow hole connected to the inflow hole and configured to be connected to the first or second line by a rotation of the ball valve; and
expansion grooves connected to an end of the outflow hole.

10. The vapor injection module of claim 9, wherein the expansion grooves are respectively formed at two opposite sides of the outflow hole based on a rotation direction of the ball valve and configured to expand and discharge the introduced refrigerant.

11. The vapor injection module of claim 10, wherein the ball valve has a rotation angle range of 180 degrees.

12. The vapor injection module of claim 11, wherein the expansion grooves of the ball valve are disposed to overlap the first line or the second line to expand the refrigerant.

13. The vapor injection module of claim 9, wherein the expansion grooves are formed at one side of the outflow hole based on a rotation direction of the ball valve and configured to expand and discharge the introduced refrigerant.

14. The vapor injection module of claim 13, wherein the ball valve has a rotation angle range of 360 degrees.

15. The vapor injection module of claim 14, wherein the expansion groove of the ball valve is disposed to overlap the first line or the second line to expand the refrigerant.

16. The vapor injection module of claim 15, wherein the ball valve controls the amount of expansion of the refrigerant by adjusting a region in which the expansion groove overlaps the first line or the second line.

17. A vapor injection module comprising:
a first expansion valve having an inlet port into which a refrigerant is introduced, and first line and second line connected to the inlet port so that the introduced refrigerant flows therethrough, the first expansion valve being disposed at a connection portion between the first line and the second line and configured to control a flow direction of the refrigerant and whether to expand the refrigerant depending on an air conditioning mode;
a gas-liquid separator connected to the first line and configured to separate the introduced refrigerant into a liquid refrigerant and a gaseous refrigerant;
a second expansion valve connected to a movement passage through which the liquid refrigerant separated in the gas-liquid separator flows, the second expansion valve being configured to expand the introduced refrigerant; and
a first outlet port connected to the second line and the second expansion valve,
wherein the second expansion valve comprises:
an orifice configured to expand the refrigerant introduced through the movement passage; and
a check valve configured to determine whether to move the refrigerant,
wherein the check valve is operated by a pressure difference between the movement passage and the refrigerant flowing along the second line.

18. A vapor injection heat pump system comprising:
a compressor configured to compress and discharge a refrigerant;
a condenser configured to condense the compressed refrigerant at the time of heating a vehicle interior;
a first expansion valve configured to expand the condensed refrigerant and transmit the expanded refrigerant to an exterior heat exchanger, expand the condensed refrigerant and transmit the expanded refrigerant to a gas-liquid separator, or allow the condensed refrigerant to pass therethrough depending on an air conditioning mode;
the gas-liquid separator configured to separate the refrigerant expanded by the first expansion valve into a gaseous refrigerant and a liquid refrigerant, discharge the gaseous refrigerant to the compressor, and discharge the liquid refrigerant to a second expansion valve;
the second expansion valve configured to expand the liquid refrigerant discharged from the gas-liquid separator and transmit the expanded refrigerant to the exterior heat exchanger;
the exterior heat exchanger configured to condense or evaporate the refrigerant transmitted from the first or second expansion valve;
a third expansion valve configured to control a flow direction and whether to expand the refrigerant transmitted from the exterior heat exchanger depending on the air conditioning mode;
an evaporator configured to cool a vehicle interior by using the refrigerant transmitted from the third expansion valve;

a fourth expansion valve connected to the third expansion valve in parallel; and a chiller connected to the fourth expansion valve and configured to allow the refrigerant and a coolant to exchange heat with each other.

19. The vapor injection heat pump system of claim 18, wherein when the air conditioning mode is a cooling mode, the first expansion valve allows the compressed refrigerant to pass therethrough and transmits the refrigerant to the exterior heat exchanger.

20. The vapor injection heat pump system of claim 18, wherein when the air conditioning mode is a non-vapor injection heating mode, the first expansion valve expands the condensed refrigerant and transmits the expanded refrigerant to the exterior heat exchanger.

21. The vapor injection heat pump system of claim 18, wherein when the air conditioning mode is a vapor injection heating mode, the first expansion valve expands the condensed refrigerant and transmits the expanded refrigerant to the gas-liquid separator.

22. The vapor injection heat pump system of claim 18, wherein an orifice integrated check valve, an electronic expansion valve, or an orifice integrated shut-off valve is used as the second expansion valve.

23. A vapor injection heat pump system comprising:
a compressor configured to compress and discharge a refrigerant;
a condenser configured to condense the compressed refrigerant at the time of heating a vehicle interior;
a first expansion valve configured to expand the condensed refrigerant and transmit the expanded refrigerant to an exterior heat exchanger, expand the condensed refrigerant and transmit the expanded refrigerant to a gas-liquid separator, or allow the condensed refrigerant to pass therethrough depending on an air conditioning mode;
the gas-liquid separator configured to separate the refrigerant expanded by the first expansion valve into a gaseous refrigerant and a liquid refrigerant, discharge the gaseous refrigerant to the compressor, and discharge the liquid refrigerant to a second expansion valve;
the second expansion valve configured to expand the liquid refrigerant discharged from the gas-liquid separator and transmit the expanded refrigerant to the exterior heat exchanger;
the exterior heat exchanger configured to condense or evaporate the refrigerant transmitted from the first or second expansion valves;
a third expansion valve configured to control a flow direction and whether to expand the refrigerant transmitted from the exterior heat exchanger depending on the air conditioning mode;

an evaporator configured to cool a vehicle interior by using the refrigerant transmitted from the third expansion valve; and
an interior heat exchanger configured to heat the vehicle interior by allowing air conditioning air to exchange heat with a coolant having exchanged heat with the refrigerant in the condenser.

24. The vapor injection heat pump system of claim 23, wherein a coolant heater is disposed between the condenser and the interior heat exchanger.

25. The vapor injection heat pump system of claim 23, comprising:
a refrigerant circulation line in which the refrigerant circulates;
a coolant circulation line in which the coolant circulates; and
an air conditioning casing configured to accommodate the evaporator and the interior heat exchanger and perform the heat exchange with the air conditioning air,
wherein the evaporator is disposed in the refrigerant circulation line, and the interior heat exchanger is disposed in the coolant circulation line.

26. The vapor injection heat pump system of claim 25, wherein the coolant circulation line comprises:
a heating line configured to heat the vehicle interior by circulating the coolant; and
a refrigerating line configured to cool a battery and an electrical component by circulating the coolant.

27. The vapor injection heat pump system of claim 26, wherein the refrigerating line comprises a third connection line connected to the battery in parallel and configured to pass through a chiller, the third connection line is connected to the refrigerating line by a third direction switching valve, and a flow of the coolant in the third connection line is allowed or cut off by the third direction switching valve.

28. The vapor injection heat pump system of claim 26, wherein the refrigerating line comprises:
a first connection line branching off from one side of the refrigerating line and connected to the heating line; and
a second connection line branching off from the other side of the refrigerating line and connected to the heating line.

29. The vapor injection heat pump system of claim 28, wherein the first connection line, the second connection line, and the heating line are connected to a first direction switching valve, and the refrigerating line and the heating line are connected to or disconnected from each other by the first direction switching valve.

* * * * *